United States Patent
Patil

(10) Patent No.: US 12,271,816 B2
(45) Date of Patent: Apr. 8, 2025

(54) CLASS-DISPARATE LOSS FUNCTION TO ADDRESS MISSING ANNOTATIONS IN TRAINING DATA

(71) Applicant: Genentech, Inc., South San Francisco, CA (US)

(72) Inventor: Jasmine Patil, South San Francisco, CA (US)

(73) Assignee: GENENTECH, INC., South San Francisco, CA (US)

( * ) Notice: Subject to any disclaimer, the term of this patent is extended or adjusted under 35 U.S.C. 154(b) by 297 days.

(21) Appl. No.: 17/885,221

(22) Filed: Aug. 10, 2022

(65) Prior Publication Data

US 2022/0383621 A1 Dec. 1, 2022

Related U.S. Application Data

(63) Continuation of application No. PCT/US2021/020901, filed on Mar. 4, 2021.

(Continued)

(51) Int. Cl.
*G06N 3/08* (2023.01)
*G06V 10/764* (2022.01)
*G06V 10/82* (2022.01)

(52) U.S. Cl.
CPC ............. *G06N 3/08* (2013.01); *G06V 10/764* (2022.01); *G06V 10/82* (2022.01)

(58) Field of Classification Search
CPC ........ G06N 3/08; G06N 3/045; G06V 10/764; G06V 10/82; G06V 10/7747; G06V 2201/032; G06F 18/2148

(Continued)

(56) References Cited

U.S. PATENT DOCUMENTS

| 8,688,603 B1 * | 4/2014 | Kurup | G06N 20/10 706/12 |
| 2019/0295252 A1 | 9/2019 | Fuchs et al. | |
| 2020/0160997 A1 * | 5/2020 | Bagci | A61B 6/037 |

FOREIGN PATENT DOCUMENTS

| WO | 2019150813 A1 | 8/2019 |
| WO | 2021178685 A1 | 9/2021 |

OTHER PUBLICATIONS

Esteva, et al., Dermatologist-Level Classification of Skin Cancer with Deep Neural Networks, Nature. Feb. 2, 2017; 542(7639): 115-118. doi:10.1038/nature21056.

(Continued)

*Primary Examiner* — Juan A Torres
(74) *Attorney, Agent, or Firm* — Kilpatrick Townsend & Stockton LLP

(57) ABSTRACT

A data set can be provided that includes an input data element and one or more label data portion definitions that each identify a feature of interest within the input data element. A machine-learning model can generate model-identified portions definitions that identify predicted feature of interests within the input data element. At least one false negative (where a feature of interest is identified without a corresponding predicted feature of interest) and at least one false positive (where a predicted feature of interest is identified without a corresponding feature of interest) can be a identified. A class-disparate loss function can be provided that is configured to penalize false negatives more than at least some false positives. A loss can be calculated using the class-disparate loss function. A set of parameter values of the machine-learning model can be determined based on the loss.

20 Claims, 10 Drawing Sheets

Related U.S. Application Data

(60) Provisional application No. 62/986,176, filed on Mar. 6, 2020.

(58) Field of Classification Search
USPC ............................................... 382/155
See application file for complete search history.

(56) References Cited

OTHER PUBLICATIONS

Siegel, et al., Cancer Statistics, 2019. CA: A Cancer Journal for Clinicians, 2019, vol. 69, No. 1, pp. 7-34.

Tay-Teo, et al., Comparison of Sales Income and Research and Development Costs for FDA-Approved Cancer Drugs Sold by Originator Drug Companies. JAMA Network Open, 2019, pp. 1-11.

Suzuki, et al., Radiologic Measurements of Tumor Response to Treatment: Practical Approaches and Limitations, RadioGraphics 2008; 28:329-344, published online 10.1148/rg.282075068.

Hua, et al., Detecting Brain Growth Patterns in Normal Children using Tensor-Based Morphometry. Human Brain Mapping 30:209-219, 2009.

Ding, et al., 4DCT-based Measurement of Changes in Pulmonary Function Following a Course of Radiation Therapy. Med. Phys. 37 (3), Mar. 2010, pp. 1261-1272.

Ou, et al., Deformable Registration for Quantifying Longitudinal Tumor Changes During Neoadjuvant Chemotherapy. Magn Reason Med. Jun. 2015; 73(6): 2343-2356, doi:10.1002/mrm.25368, all pages.

Sadegh, et al., Quantifying Local Tumor Morphological Changes with Jacobian Map for Prediction of Pathologic Tumor Response to Chemo-Radiotherapy in Locally Advanced Esophageal Cancer, Physics in Medicine and Biology, 63, 2018, 145020, 13 pages.

Sakamoto, Detection of Time-Varying Structures by Large Deformation Diffeomorphic Metric Mapping to Aid Reading of High-Resolution CT Images of the Lung, . Public Library of Science, 2014, 13 pages.

Socinkski, et al., Atezolizumab for First-Line Treatment of Metastatic Nonsquamous NSCLC, The New England Journal of Medicine, 2018;378:2288-301.

Klein, et al., Elastix: A Toolbox for Intensity-Based Medical Image Registration. IEEE Transactions on Medical Imaging, vol. 29, No. 1, 2009.

Marstal, et al., SimpleElastix: A User-Friendly, Multi-Lingual Library for Medical Image Registration, Conference on Computer Vision and Pattern Recognition, 2016, pp. 134-142.

Davide Giavarina, Understanding Bland Altman Analysis, Biochemia Medica, 2015;25(2):141-51.

Mattes, et al., PET-CT Image Registration in the Chest Using Free-form Deformations. IEEE Transactions on Medical Imaging, vol. 22, No. 1, Jan. 2003, pp. 120-128.

\* cited by examiner

CLASS-DISPARATE LOSS FUNCTION TO ADDRESS MISSING ANNOTATIONS IN TRAINING DATA

CROSS-REFERENCE TO RELATED APPLICATIONS

This application is a continuation of International Patent Application No.: PCT/US2021/020901, filed Mar. 4, 2021, which claims the benefit of and the priority to U.S. Provisional Patent Application No. 62/986,176, filed on Mar. 6, 2020, the contents of which are incorporated herein by reference in their entirety for all purposes.

BACKGROUND

The advent of deep learning has fostered improvements in computer-aided detection and diagnosis in medical imaging. Medical imaging toolkits that utilize deep learning techniques can significantly aide radiologists in the detection and localization of lesions. At least some of the advances in the performance and accuracy of medical imaging over the past decade can particularly be attributed to the use of convolutional neural networks, which have been used to perform automated lesion detection and segmentation in the liver; classification of skin cancer; and unsupervised classification of various types (e.g., liver, lung, lymph node, or abdominal) of lesions.

Currently, CT scans are typically manually annotated based upon the Response Evaluation Criteria in Solid Tumors (RECIST) criteria. The RECIST criteria stipulates that a lesion with a diameter less than 10 mm is classified as a non-measurable lesion, while a lesion greater than 10 mm is classified as a measurable lesion. The criteria further indicates that target lesions are to be selected. Each target lesion is to be a measurable lesion. No more than 5 lesions per organ and 10 lesions per scan are to be selected as target lesions. Each remaining lesions is to be classified as a non-target lesion (which may be a measurable or non-measurable lesion).

Though the RECIST criteria is commonly used within the radiology community, the criteria is not designed for use with computer-aided detection tools. Identifying and/or outlining a lesion is time consuming, and employing a radiologist to manually annotate multiple lesions can be expensive. Furthermore, the criteria's rules can result in non-target lesions not being annotated. If data annotated based on the RECIST criteria is used to train a neural network, these absent annotations may result in wrongly penalizing the network for detection of true lesions that were not annotated.

SUMMARY

The present disclosure presents a technique for defining and utilizing a particular type of loss function (e.g., a class-disparate loss function) for the automated annotation of features (e.g., lesions).

The class-disparate loss function is used to train a machine-learning model (e.g., a convolutional neural network) that is configured to process an input data element (e.g., that includes an image) and to generate output that identifies one or more model-identified portion definitions. Each of the one or more model-identified portion definitions identifies a predicted feature of interest. A predicted feature of interest can be defined by specifying a portion of the input data element (e.g., via identifying a set of pixels or voxels) that the machine-learning model predicts represents (e.g., depicts) at least part of a feature of interest (e.g., lesion). The output may predict that there are multiple instances of the feature of interest represented in the input data element. Each of the one or more model-identified portion definitions can include position data (e.g., a set of pixels or a set of voxels) that corresponds to a region predicted to represent a predicted feature of interest and a confidence metric. For example, a model-identified portion definition may indicate—for each of multiple lesions—which portion of an input image the machine-learning model predicts depicts the at least part of the lesion. A high confidence metric can indicate that the model predicted it was more likely that the portion represented a feature of interest relative to a low confidence metric.

The class-disparate loss function is configured to penalize at least some false negatives more than false positives. In some instances, the class-disparate loss function does not penalize at least some of the false positives. The class-disparate loss function can be configured to determine losses based on the confidence metrics. False positives associated with higher confidence metrics may be penalized less than false positives associated with lower confidence metrics. For example, each confidence metric (e.g., associated with a false-positive instance) can be compared to a predetermined threshold value. In the event that the confidence metric associated with a false positive is greater than the predetermined threshold value, the class-disparate loss function may indicate that no penalty is to be provided for the instance.

Using a class-disparate loss function that penalizes at least some false negatives more than false positives can be particularly advantageous when training data includes incomplete annotations of all true features represented in input data elements (e.g., which is common in many CT image datasets). The class-disparate loss function may be even more advantageous when a quantity of unannotated features in a training data set exceeds a quantity of annotated features. In these cases, if false positives and false negatives were penalized equally, a machine-learning model may learn to err against predicting features. For example, suppose that an image includes 40 true features, but only 2 are labeled. If, during training, the model correctly identified each of the 40 features, one type of loss function may introduce penalties for predicting the 38 true features that were unlabeled. This may result in the model learning to under-predict features. By contrast, using a class-disparate loss function (that used reduced penalties or does not penalize when false positives are associated with high confidence metrics) can reduce or avoid this type of undesired learning. Thus, the class-disparate loss function can facilitate training a model to accurately and reliably detect features while using an incompletely annotated training data set, which may save time and/or cost in obtaining a useful training data set. For example, an existing dataset that has been annotated according to RECIST criteria can be used to train a neural network, instead of requiring that new and complete annotation be performed. Further, the time and/or cost savings associated with annotating individual input data elements may support collecting and/or annotating additional data elements, such that a larger training data set can be used. The larger training data set may include more variation in image characteristics, which may result in a more robust and/or versatile model.

In some embodiments, a computer-implemented method is provided that includes providing a data set including: an input data element, and one or more label data portion definitions that each identify a feature of interest within the input data element. The computer-implemented method further includes training a machine-learning model using the data set by performing a set of operations including: generating one or more model-identified portion definitions that each identify a predicted feature of interest within the input data element (the one or more model-identified portion definitions being generated based on the machine-learning model); classifying the feature of interest identified by a particular label data portion definition of the one or more label data portion definitions as a false negative by determining a mismatch between the particular label data portion definition and each of the one or more model-identified portion definitions; and classifying the predicted feature of interest identified by a particular model-identified portion definition of the one or more model-identified portion definitions as a false positive by determining a mismatch between the particular model-identified portion definition and each of the one or more label data portion definitions. The set of operations further includes providing a class-disparate loss function configured to penalize false negatives more than at least some false positives; calculating a loss using the class-disparate loss function, wherein the calculation includes assigning a penalty for the classification of the feature of interest as a false negative that is larger than any penalty assigned for the classification of the predicted feature of interest as a false positive; and determining a set of parameter values of the machine-learning model based on the loss.

In some instances, the set of operations further includes updating the machine-learning model to be configured with the set of parameter values; and training the machine-learning model includes iteratively performing the set of operations multiple times, wherein a next performance of the set of operations includes training the machine-learning model using at least one other input data element included in the data set.

In some instances, the computer-implemented method further includes generating, for the particular model-identified portion definition, a confidence metric representing a confidence of the predicted feature of interest existing; wherein calculating the loss includes calculating a penalty assigned for the classification of the predicted feature of interest as a false positive based on the confidence metric. Calculating the loss may include determining that the confidence metric exceeds a predetermined threshold; and setting the penalty assigned for the classification of the predicted feature as a false positive to zero.

The input data element may include an image, and wherein each of the one or more model identified portion definitions identifies a set of pixels. The machine-learning model may include a convolutional neural network and/or a deep neural network. The set of parameter values may include values for a set of weights. The input data element may an image, and, for each label-data portion definition of the one or more label data portion definitions, the feature of interest identified in the label-data portion definition may be a tumor, a lesion, a particular cell type, or vasculature.

The computer implemented may further include determining a quantity of false-positive classifications to be dropped from penalty assignment based on an estimated number of feature of interest representations in the data set; and calculating the loss may include: identifying a set of false-positive predicted features of interest each including a predicted feature of interest classified as a false positive; generating, for each of the set of false-positive predicted features of interest, a confidence metric representing a confidence of the predicted feature of interest existing; defining a subset of the set of false-positive predicted features of interest based on the quantity of false-positive classifications to be dropped and the confidence metrics; and assigning a penalty to each of false-positive predicted feature in the subset.

In some embodiments, a method is provided that includes sending a request to detect any predicted feature of interest in a particular input data element using a trained machine-learning model. The trained machine-learning model may have been configured with a set of parameter values learned by: providing a data set including: an input data element, and one or more label data portion definitions that each identify a feature of interest within the input data element; and training a machine-learning model using the data set. Training the machine-learning model includes generating one or more model-identified portion definitions that each identify a predicted feature of interest within the input data element, the one or more model identified portion definitions being generated based on the machine-learning model; classifying the feature of interest identified by a particular label data portion definition of the one or more label data portion definitions as a false negative by determining a mismatch between the particular label data portion definition and each of the one or more model-identified portion definitions; and classifying the predicted feature of interest identified by a particular model-identified portion definition of the one or more model-identified portion definitions as a false positive by determining a mismatch between the particular model-identified portion definition and each of the one or more label data portion definitions. Training the machine-learning model further includes providing a class-disparate loss function configured to penalize false negatives more than at least some false positives; calculating a loss using the class-disparate loss function, wherein the calculation includes assigning a penalty for the classification of the feature of interest as a false negative that is larger than any penalty assigned for the classification of the predicted feature of interest as a false positive; and determining the set of parameter values of the machine-learning model based on the loss. The method further includes eceiving, in response to the sending of the request, a result that identifies one or more particular model-identified portion definitions, each of the one or more particular model identified portion definitions identifying a portion of the particular input data element corresponding to a predicted feature of interest.

The method may further include determining a diagnosis or treatment for a subject corresponding to the particular input data element based on the one or more particular model-identified portion definitions; and outputting an identification of the diagnosis or treatment. The method may additionally or alternatively include collecting the particular input data element using a computed tomography (CT) scanner, magnetic resonance imaging (MRI) machine, or microscope.

In some embodiments, a system is provided that includes one or more data processors; and a non-transitory computer readable storage medium containing instructions which, when executed on the one or more data processors, cause the one or more data processors to perform a set of actions. The set of actions can include providing a data set including: an input data element, and one or more label data portion definitions that each identify a feature of interest within the input data element. The set of actions can include training the machine-learning model using the data set. The training can include generating one or more model-identified portion definitions that each identify a predicted feature of interest within the input data element, the one or more model identified portion definitions being generated based on the machine-learning model; classifying the feature of interest identified by a particular label data portion definition of the one or more label data portion definitions as a false negative by determining a mismatch between the particular label data portion definition and each of the one or more model-identified portion definitions; classifying the predicted feature of interest identified by a particular model-identified portion definition of the one or more model-identified portion definitions as a false positive by determining a mismatch between the particular model-identified portion definition and each of the one or more label data portion definitions; providing a class-disparate loss function configured to penalize false negatives more than at least some false positives; calculating a loss using the class-disparate loss function, wherein the calculation includes assigning a penalty for the classification of the feature of interest as a false negative that is larger than any penalty assigned for the classification of the predicted feature of interest as a false positive; and determining the set of parameter values of the machine-learning model based on the loss.

In some embodiments, a computer-program product tangibly embodied in a non-transitory machine-readable storage medium, including instructions configured to cause one or more data processors to perform part or all of one or more methods disclosed herein.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures.

DETAILED DESCRIPTION

I. Overview

Figure 1:
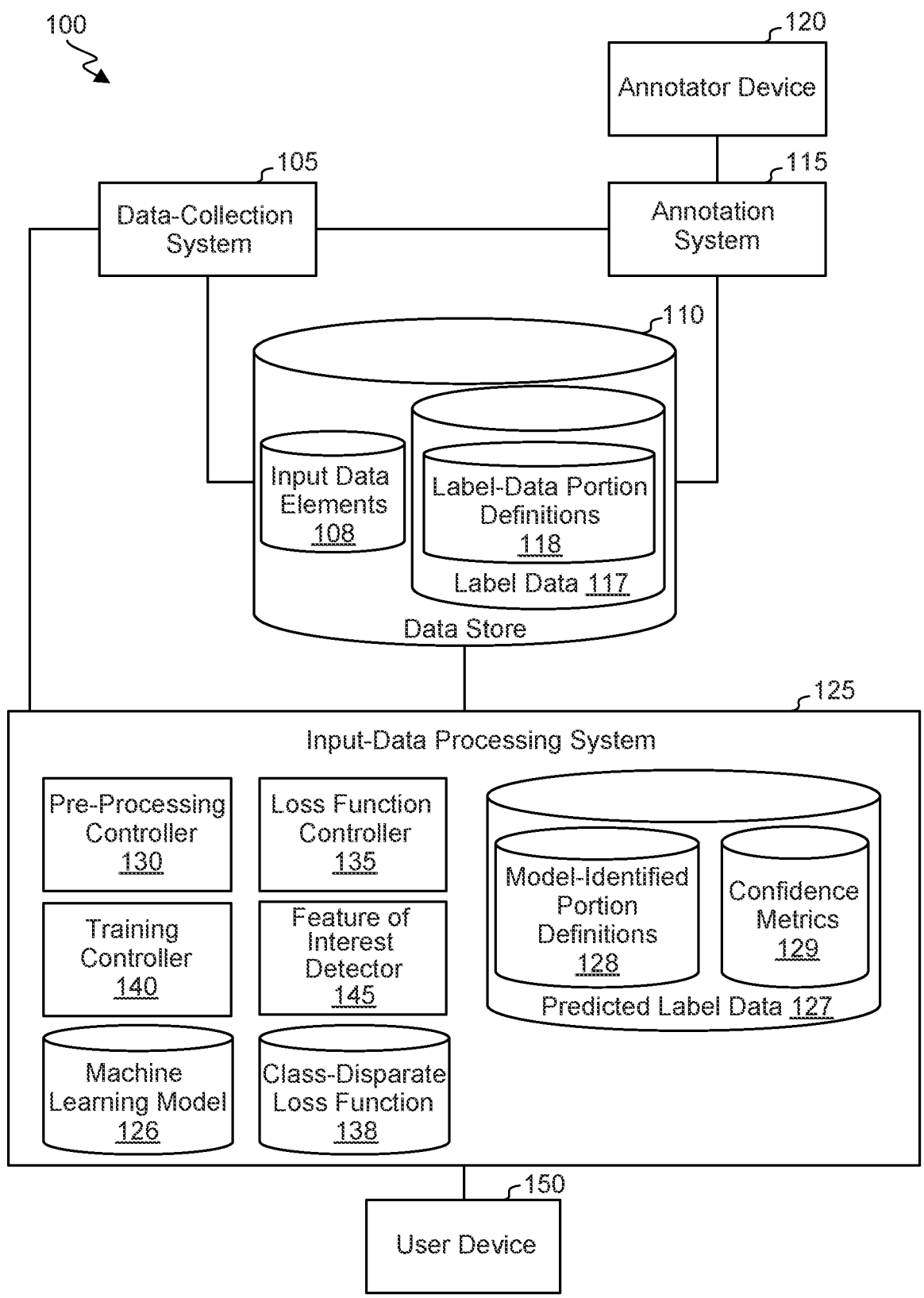
FIG. 1 shows an exemplary feature-of-interest detection network according to some embodiments.

An image (e.g., a two-dimensional or three-dimensional image) can be collected using an imaging system. The image can be transmitted to and presented at an annotator device (e.g., may be any suitable device for labelling part(s) of the image). Input received (either manually, or automatically from a computer) at the annotator device can be used to identify which part(s) of the image correspond to a particular feature of interest (e.g., a lesion). For example, the input can correspond to an outline of each of one or more lesions. In some instances, the input may only identify a single or a limited number of portions within the image that correspond to the feature of interest, disregarding any remaining portions that may also correspond to the feature of interest as background data. The incomplete set of identified portion(s) of the image are stored as label data. Thus, a portion included in the label data is referred to as a "label-data portion". For example, label data may indicate—for each of one or more target lesions—which pixels or voxels are part of a perimeter of the lesion, an area of the lesion or a volume of the lesion, and a label-data portion can be defined to identify the area or volume of the lesion. As another example, label data may identify—for each of one or more target lesions—a bounding box that bounds the lesion (e.g., is a 2-dimensional or 3-dimensional box that is small enough to largely omit other portions of the image that do not depict the lesion), and a label-data portion can be defined to identify an area or volume of the bounding box.

The image and its corresponding label data are delivered to an automated image-annotation system. Label data may be used as training, validation or testing data to facilitate training of a machine-learning model. The machine-learning model can be configured with a set of parameters (for which values are to be learned) and hyperparameters (which are set and not to be learned). For example, the set of parameters may include a set of weights, such that values of the weights are learned during training. The machine-learning model can include a neural network, such as a convolutional neural network and/or a deep neural network. The machine-learning model can be configured to receive input data that includes a digital image and to output predictions as to which (if any) part(s) of an input image is predicted to depict a feature (or part of a feature).

During training, the machine-learning model uses a class-disparate loss function in order to iteratively adjust parameter values based on an extent to which model outputs corresponded to labels. More specifically, the machine-learning model is configured to receive an image and to identify each portion of the image corresponding to a predicted feature of interest. Each of these portions is thus referred to herein as a "model-identified portion". As used herein, a "predicted feature of interest" corresponds to a feature of interest that the machine-learning model predicts is being at least partly represented (e.g., at least partly depicted) in an input data element. The class-disparate loss function is configured to calculate a loss based a degree to which model-identified portions corresponded to the label-data portions.

More specifically, predicted label data 127 may include multiple particular model-identified portions that are not represented in the label data 117. Each of these multiple particular model-identified portions may be characterized as a false-positive instances where an output of the model includes a model-identified portion (predicted to represent at least part of a feature of interest) that does not correspond to any label-identified portion in the label data.

A false negative corresponds to an instance where a feature of interest identified by a label-identified portion in the label data does not correspond to any predicted feature of interest (represented by any model-identified portion corresponding to the input data element). One type of loss function would indiscriminately penalize all false positives and all false negatives equally. However, when annotation data is incomplete, this type of loss function can impose penalties when a model detects a true (though unlabeled) feature of interest. Thus, the loss function may result in producing a model with impaired accuracy, sensitivity and/or specificity. These impairments become even more pronounced when there is a class imbalance in the training data set (e.g., when the training data set includes more non-lesion depictions than lesion depictions).

Another approach is to use a loss function (e.g., a class-disparate loss function) that penalizes false negatives more than false positives, only penalizes false negatives (and not false positives), differentially penalizes false positives (e.g., based on associated confidence metrics), and/or penalizes only a subset of false positives (e.g., any associated with a confidence metric below a predefined threshold). For example, the loss function can select each predicted feature of interest that is associated with a confidence metric above a predefined absolute or relative confidence (e.g., a top-3 confidence across all predicted features of interest for an image) and set a penalty for each selected model-identified portion to 0. As such, the machine-learning model can utilize the class-disparate loss function and its variants in order to reduce penalties for misclassifications in the initial training data set, which can improve the training and the model's accuracy.

II. Exemplary Network for Detecting Features of Interest in Medical Images

FIG. 1 shows an exemplary feature-of-interest detection network 100 according to some embodiments. Feature-of-interest detection network 100 is configured to support training and using a machine-learning model to detect depictions of features of interest (e.g., lesions) within input data elements (e.g., images). For example, a feature of interest can include a lesion, a particular cell type, or vasculature. As used herein, a lesion refers to a tissue abnormality or tissue damage caused by disease or trauma. A particular type of lesion includes a tumor.

Feature-of-interest detection network 100 includes a data-collection system 105 that collects raw versions of input data elements 108 that are to be processed. Each raw version of input data element 108 may include data corresponding to a subject. The subject may include a person who has been diagnosed with or has possible diagnosis of a particular disease and/or or who has symptoms consistent with a particular disease. The particular disease may include cancer or a particular type of cancer. Data-collection system 105 may be configured to collect imaging data, biological signal data, time-series physiological data, etc.

Data-collection system 105 can include an image-generation system configured to collect images (e.g., one or more images of a part of a body of a subject). Data-collection system 105 may include (for example) a computed tomography (CT) scanner, x-ray machine or a magnetic resonance imaging (MRI) machine. Data-collection system 105 may further or alternatively include a picture and archiving stems (PACS) system, such as a hospital PACS system. Each image may depict at least part of one or more biological structures (e.g., at least part of one or more lesions and/or at least part of one or more organs).

The image(s) include one or more two-dimensional images and/or one or more three-dimensional images. The image(s) may include (for example) a radiological image, CT image, x-ray image or MM image. The image(s) may have been collected without a contrast agent was administered to the subject or after a contrast agent was administered to the subject. In some instances, data-collection system 105 may initially collect a set of two-dimensional images and generate a three-dimensional image using the two-dimensional images.

Data-collection system 105 stores raw versions of input data elements 108 (e.g., images) in a data store 110, which may include (for example) a cloud data store. Each raw version of input data element 108 may be stored in association with one or more identifiers, such as an identifier of a subject and/or an identifier of a care provider associated with the subject. Each raw version of input data element 108 may further be stored in association with a date on which the image was collected.

In some instances, one or more raw versions of input data elements 108 are further availed to an annotation system 115, which can facilitate identifying label data 117. Annotation system 115 controls and/or avails an annotation interface that presents part or all of a raw version of one or more input data elements 108 to annotator device 120 and that includes a component to accept inputs received at annotator device 120 specifying which portion(s) of each input data element correspond to a feature of interest. For example, the inputs may identify one or more boundaries, bounding boxes, perimeters, areas, and/or volumes that depict a lesion. Annotation system 115 can include a "pencil", or "pen" tool that can be positioned based on input and can produce markings along an identified boundary. Annotation system 115 can include a "box", "rectangle", or "rectangular prism" tool that can be lengthened and/or shortened in each of two or three dimensions to bound a depiction of a representation of a feature of interest.

Annotator device 120 may be operated by a human annotator user trained to detect features of interest, and the human annotator user can interact with tools availed by annotation system 115 (via annotator device 120) to annotate each feature of interest (e.g., lesion).

In some instances, annotation system 115 facilitates identifying closed shapes, such that small gaps within a line segment are connected. In some instances, annotation system 115 facilitates identifying potential boundaries via (for example) performing an intensity and/or contrast analysis. Thus, annotation system 115 may support tools that facilitate performing semi-automated segmentation. Annotation system 115 can be a web server that can avail the interface via a website.

The annotation interface is availed to an annotator device 120, which may be associated with, owned by, used by and/or controlled by a human annotator user. The annotator user may be (for example) a radiologist, a pathologist or an oncologist. Annotator device 120 receives inputs from an annotator user and transmits annotation data (e.g., identifications of a set of pixels) to annotation system 115.

Annotation system 115 can generate label data 117 based on the input received from annotator device 120. Label data 117 includes, for each input data element 108, a one or more label-data portion definitions 118 identified based on the input received from annotator device 120. Each label-data portion definition 118 identifies a portion of input data element 108 that depicts at least part of a feature of interest. Label data 117 can include one or more label-data portion definitions 118 that indicate where, within one or more images, at least part of a lesion is depicted. Annotation system 115 stores label data 117 in data store 110.

Each label-data portion definition 118 may include (for example) a set of pixels and/or a set of voxels that have been identified as defining at least part of a boundary, perimeter, area, or volume of a feature of interest. A boundary may be identified as a set of pixels (e.g., that correspond to corners of a boundary or that correspond to all pixels along a perimeter), a set of voxels, a set of lines, or one or more two-dimensional areas. Each label-data portion may include a definition of a one-, two-, or three-dimensional bounding box (e.g., a rectangular box or a rectangular prism) that bounds a depiction of a feature of interest (e.g., depicting a temporal time window, an area of a two-dimensional image, or a volume of a three-dimensional image). Each label-data portion definition 118 may be stored in data store 110 in association with one or more unique identifiers of a corresponding feature of interest (e.g., Lesion 4 for Subject ABC, or Lesion 583920).

Label data 117 may include incomplete annotations. For example, with respect to a single image or a collection of images (associated with a same subject and image-collection date), a label-data portion definition 118 may identify a predicted bounding box, perimeter, area, or volume of the depiction of one or more lesions but label data 117 may have not included an additional label-data portion definition 118 that identifies a predicted bounding box, perimeter, area, or volume of one or more other lesions.

Each of one or more label-data portion definitions 118 may have been identified in accordance with the Response Evaluation Criteria in Solid Tumors (RECIST) criteria. Each "target" lesion that is represented in a label-data portion definition 118 may include a "measurable" lesion that has a diameter greater than 10 mm. Further, the target lesions may include five or fewer lesions per organ and ten or fewer lesions per scan are to be selected as target lesions. Meanwhile, the RECIST criteria does not require that all lesions be annotated, meaning that label data 117 may fail to include a label-data portion definition 118 for each of one, more or many measurable lesions and/or one, more or many non-measurable lesions. Thus, it is possible that label data 117 not identify a bounding box, perimeter, area, or volume for each of one or more non-target lesions.

An input-data processing system 125 (e.g., which may include a remote and/or cloud-based computing system) is configured to train and/or use a machine-learning model 126 to receive a raw version of one or more input data elements 108 and to generate predicted label data 127, which includes one or more model-identified portion definitions 128 and potentially corresponding confidence metrics 129. Each model-identified portion definition 128 can identify a portion of an input data element 108 that machine-learning model 126 predicts depicts at least part of a feature of interest. For example, machine-learning model 126 can be configured to receive and process a raw version of or pre-processed version of a given input data element 108 that includes a medical image. Machine-learning model 126 can output a result that indicates which portions of input data element 108 are predicted to depict at least part of a lesion. For example, an output may include a numerical value for each pixel in an image, where a value of 0 indicates that it was predicted that the corresponding pixel did not depict at least part of a lesion, and where a non-zero value represents an identifier of a lesion and indicates that it was predicted that the corresponding pixel depicts at least part of that lesion. For each unique lesion identifier, a model-identified portion definition 128 can be generated (e.g., by training controller 140 and/or feature of interest detector) based on the pixels associated with the identifier.

Each model-identified portion definition 128 may identify a boundary, area or volume of the portion. Machine-learning model 126 can further output, for each of the predicted feature-of-interest portions, confidence metric 129 indicating how confident the model was that the identified portion truly depicted at least part of a feature of interest.

Input-data processing system 125 includes a pre-processing controller 130, which initiates and/or controls pre-processing of a raw version of input data element 108 (e.g., a raw image). The pre-processing may include (for example) converting an image to a predefined format, resampling an image to a predefined sampling size, normalizing intensity values across an image, cropping an image to a predefined size, modifying an image to have a predefined resolution, aligning multiple images, generating a three-dimensional image based on multiple two-dimensional images, generating one or more images having a different (e.g., target) perspectives, adjusting (e.g., standardizing or normalizing) intensity values, and/or adjusting color values.

Pre-processing controller 130 may pre-process each input data element 108 in a training data set used to train machine-learning model 126 and/or each other input data element 108 that is processed by the machine-learning model 126 after the model is trained. Parameters used to define the pre-processing may be learned and/or pre-defined.

A loss function controller 135 defines a loss function that is used to train machine-learning model 126, which is configured to process input data element 108 (e.g., a raw version of input data element 108 or a pre-processed version of input data element). It will be appreciated that input data element 108 processed by machine-learning model 126 may include a raw original version of input data element 108 (collected by a data generation system) or a pre-processed version of input data element 108. Machine-learning model 126 can be defined by and can include a model architecture, one or more hyperparameters (e.g., a learning rate, batch size, etc.), and one or more parameters (e.g., one or more weights). Each parameter may be initialized to an initial value before training, and training can result in a new value for the parameter being learned. Machine-learning model 126 can include one or more convolutional neural networks, a ResNet, and/or a feature pyramid network. Thus, machine-learning model 126 can include an architecture for a convolutional neural network, for a ResNet or for a feature pyramid network.

In some instances, the loss function used by loss function controller 135 calculates a loss that is or that is based on a focal loss (FL), where the focal loss is defined as:

$$FL(pt) = -\alpha t(1-pt)^\gamma \log(pt) \quad \text{Eqn. 1}$$

where at is a constant weighting hyperparameter; where pt is an absolute-value confidence metric 129 as defined as:

$$pt = p \text{ if } y=1$$

$$pt = 1-p \text{ if } y \neq 1 \quad \text{Eqn. 2}$$

where $y \in \{\pm 1\}$ specifies a ground-truth class and $p \in [0, 1]$ is confidence metric 129 for the ground-truth class with a label y=1. Each ground-truth class is determined based on label data 117. In this instance, a label of y=1 is used to refer to any feature of interest (e.g., target lesion) defined in a label-data portion definition 118. For example, a label of y=1 is used to refer to a labeled lesion in annotated in an input image. A label for any other value of y (e.g., that is not 1) refers to a part of the input data element 108 that is not considered to represent (e.g., depict) a feature of interest.

Figure 2:
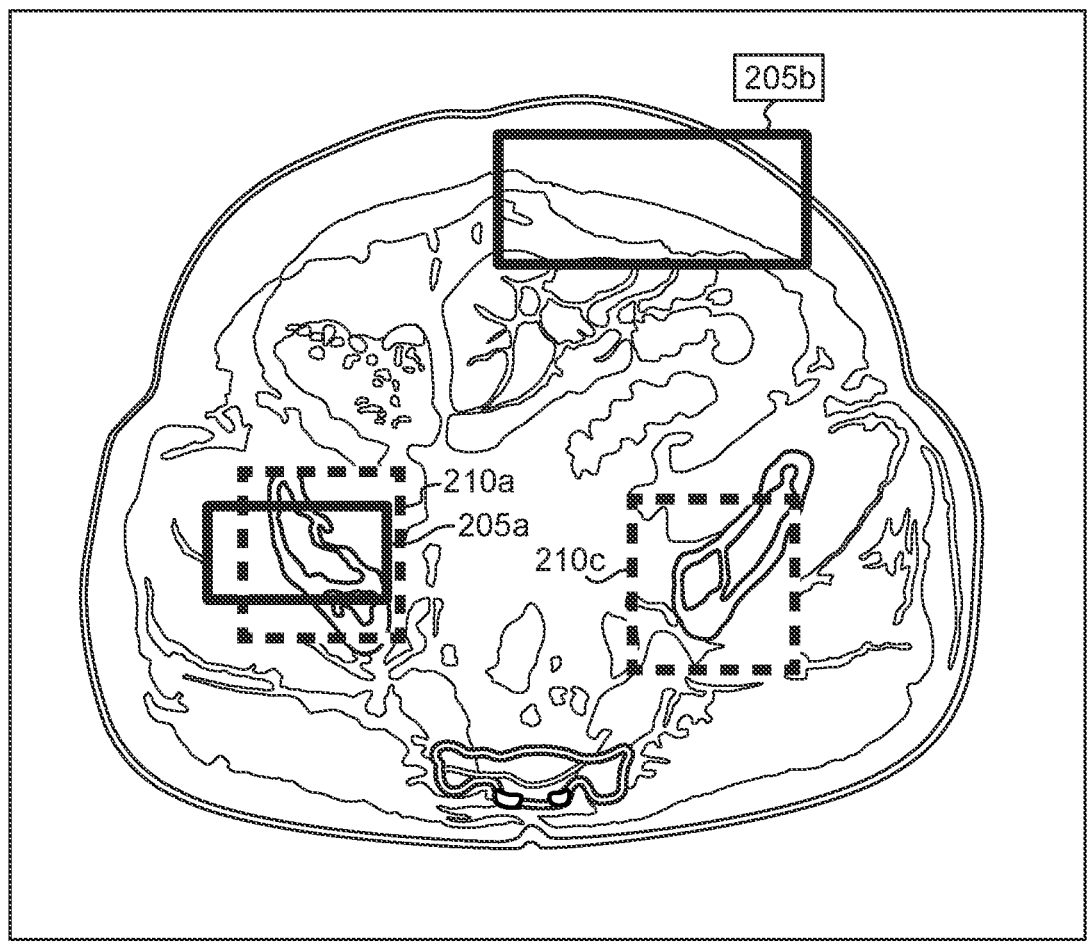
FIG. 2 shows exemplary annotations of lesions as identified within label data and separately as identified based on output from a machine-learning model.

For example, in the illustration depicted in FIG. 2, each label-data portion (outlined by a label-data outline 205a, 205b) corresponds to a label-data annotation identified based on input from a human annotator (y=1). Each part of the image outside of label-data outlines 205a, 205b corresponds to image portions not within a label-data annotation (y=−1). Each model-identified portion (outlined by a model-identified outline 210a, 210c) corresponds to an area that machine-learning model 126 predicted depicted a lesion Thus, model-identified outline 205a and label-data outline 210a correspond to a true positive instance; label-data outline 205b corresponds to a false negative instance; and model-identified outline 210c corresponds to a false positive instance.

In some instances, the loss function is a class-disparate loss function 138. As used herein, a "class-disparate loss function" refers to a function that calculates a loss in a manner such that at least some false negatives (e.g., label-data outline 205b, which had no corresponding model-identified outline) are penalized more substantially than false positives (e.g., label-data outline 210c, which had no corresponding model-identified outline). This approach can be particularly advantageous when a training set is incompletely labeled. In some instances, class-disparate loss function 138 is configured such that false positives are not penalized, while false negatives are penalized. Class-disparate loss function 138 can include a focal loss function or modified version thereof, such that a loss imposed for each of at least some false positives depends on confidence metric 129 associated with the predicted positive.

Class-disparate loss function 138 may be defined such that false positives associated with low confidence metrics 129 are to be penalized more drastically than false positives associated with high confidence metrics 129 (e.g., when other factors are similar). The relationship between confidence metric 129 and penalty may be monotonic or stepwise (e.g., using a predefined threshold). Thus, class-disparate loss function 138 may be defined such that losses and confidence metrics 129 are anti-correlated.

As yet another example, class-disparate loss function 138 may include a dropmax focal loss function. The dropmax focal loss function may be configured such that a confidence metric 129 is assigned for each model-identified portion 128; a certain number k of the features of interest with the highest confidence metrics 129 are identified; and no penalty is to be imposed even if any of the k features of interest are false-positives. Thus, the dropmax focal loss function can be defined as:

$$\text{dropmax}_{FL}(pt) = 0 \text{ if } pt > p_{threshold}$$

$$\text{dropmax}_{FL}(pt) = FL(pt) \text{ if } pt < -p_{threshold} \quad \text{Eqn. 3}$$

where $p_{threshold}$ is the kth largest element in the array of all $p_{foreground}$ in anchor boxes where ground truth=background.

The hyperparameter k (number of background misclassifications to ignore) for the $\text{dropmax}_{FL}$ function can be (for example) predefined or selected based on the frequency of missing annotations in the training dataset. For example, a value for k may be larger when there are more unlabeled features-of-interest portions in a label data 117. The k value may be considered as an upper limit for feature-of-interest detections per input data element 108 and may be (for example) 1, 2, 3, 4, 5, 8, 10, 15, 20, at least 1, at least 2, at least 3, at least 4, at least 5, at least 8, or at least 10.

The dropmax focal loss function may also be modified in order to further process confidence metric pt. Further processing methods may include scaling and/or a normalization of one or more confidence metrics 129. In some instances, the dropmax focal loss function may further define one or more threshold values in order to determine the loss. For example, model-identified portion definitions 128 associated with confidence metric 129 greater than a first threshold value (e.g., equivalent to $p_{threshold}$) may be given a reduced or nullified loss (e.g., 0), while model-identified portion definitions 128 associated with confidence metric 129 less than the first threshold value but greater than a second threshold value (e.g., may be less than $p_{threshold}$) may be given a loss that has been reduced at a lower loss (e.g., 0.25, 0.5, 0.75, or other value less than a maximum loss). Model-identified portion definitions 128 associated with confidence metric 129 less than the second threshold may be given a loss that has not been reduced (e.g., where, for this particular example, the loss is calculated in terms of a class-disparate loss function 138). In some instances, a third threshold value (e.g., along with a fourth threshold value, a fifth threshold value, etc.) may similarly be defined. In some instances, any suitable monotonically increasing function may be used (e.g., with a set of threshold values) in order to calculate a loss for model-identified portion definitions based on confidence metrics 129.

In order to determine how many false positives, true positives, false negatives, and/or true negatives exist for a given prediction corresponding to an input data element 108, a comparison can be performed between model-identified portion definitions 128 and label-data portion definitions 118 associated with same input data elements 108. One approach is to determine, for each model-identified portion definition 128 and each label-data portion definition 118 associated with a same input data element 108, an identification (e.g., pixels, voxels, or time stamps) of a true boundary, bounding box (e.g., a 1-dimensional or 2-dimensional bounding box), area, or volume for the defined portion and to then determine whether an overlap criterion is satisfied by determining whether a boundary, a bounding box, pixels, or voxels of a "predicted" duration, area, or volume of any label-data portion overlaps by at least a threshold amount with that of a model-identified portion (or the converse).

The overlap criterion may be defined to be satisfied when it is detected that there are at least (for example) a predefined absolute quantity of time steps, pixels, voxels, or other unit of the labeled-data and model-identified portions that overlap; a predefined quantity or portion of time steps, pixels, voxels, or other units of a model-identified portion that overlaps with that of a corresponding label-data portion; a predefined quantity or portion of time steps, pixels, voxels, or other units of a label-data portion (as indicated in label data 117) that overlaps with that of a model-identified portion.

If it is determined that the overlap criterion is satisfied, a model-identified portion definition 128 associated with the overlap can be characterized as a true-positive instance. If it was determined that the overlap criterion was not satisfied for any pair-wise analysis involving a given label-data portion definition 118, the given label-data portion definition can be characterized as a false-negative instance. If—after the overlap analysis is completed for all label-data portion definitions 118 associated with a given input data element 108—one or more model-identified portion definitions associated with the given input data element 108 remain (meaning that determined that the overlap condition was not satisfied with respect to the remaining model-identified portion definition), each remaining model-identified portion definition 128 can be characterized as a false-positive instance. (A constraint may be imposed such that a given model-identified portion cannot be determined to sufficiently overlap with multiple label-data portions such that an overlap criterion is satisfied with respect to multiple label-data portions based on a single model-identified portion. Another constraint may be imposed such that a given label-data portion cannot be determined to sufficiently overlap with multiple model-identified portions such that an overlap criterion is satisfied with respect to multiple model-identified portions based on a single label-data portion.)

Another approach is to determine, for each label-data portion definition 118 identified in label data 117, if a center or centroid point of the corresponding label-data portion is sufficiently close to a center or centroid point of a model-identified portion defined by a model-identified portion definition 128 (e.g., based on a predefined distance threshold). Designations of true-positive, false-positive, and false-negative labels may then be assigned similarly as defined above.

A training controller 140 may use a training data set and class-disparate loss function 138 to train machine-learning model 126 to detect features of interest. The training data set can include (for example) input data elements 108 (e.g., raw or pre-processed versions of input data elements 108) and label data 117. Machine-learning model 126 can include a neural network executed by a feature-of-interest detector 145. Thus, training controller 140 may avail an input data element 108 in the training data set (e.g., or a pre-processed version thereof generated by pre-processing controller 130) to feature-of-interest detector 145, such that machine-learning model 126 generates an output that predicts how many features of interest are at least partly represented (e.g., depicted) within the element and/or that predicts a location of each feature of interest that is detected (e.g., by identifying a portion of input data element 108 that corresponds to the feature of interest. The output may further include—for each predicted feature of interest—a confidence metric 129 that identifies a confidence that the predicted feature of interest exists and/or a confidence of a location of a bounding box, perimeter, area, or volume identified for the predicted feature of interest.

Training controller 140 may use outputs from machine-learning model 126 (e.g., updated weights) to process unlabeled input data elements 108 (e.g., raw input data elements or pre-processed input data elements). Training controller 140 can avail the updated set of parameters to feature-of-interest detector 145, which can configure machine-learning model 126 with the updated set of parameters. The output generation and parameter updating may occur iteratively until training is complete.

Figure 3:
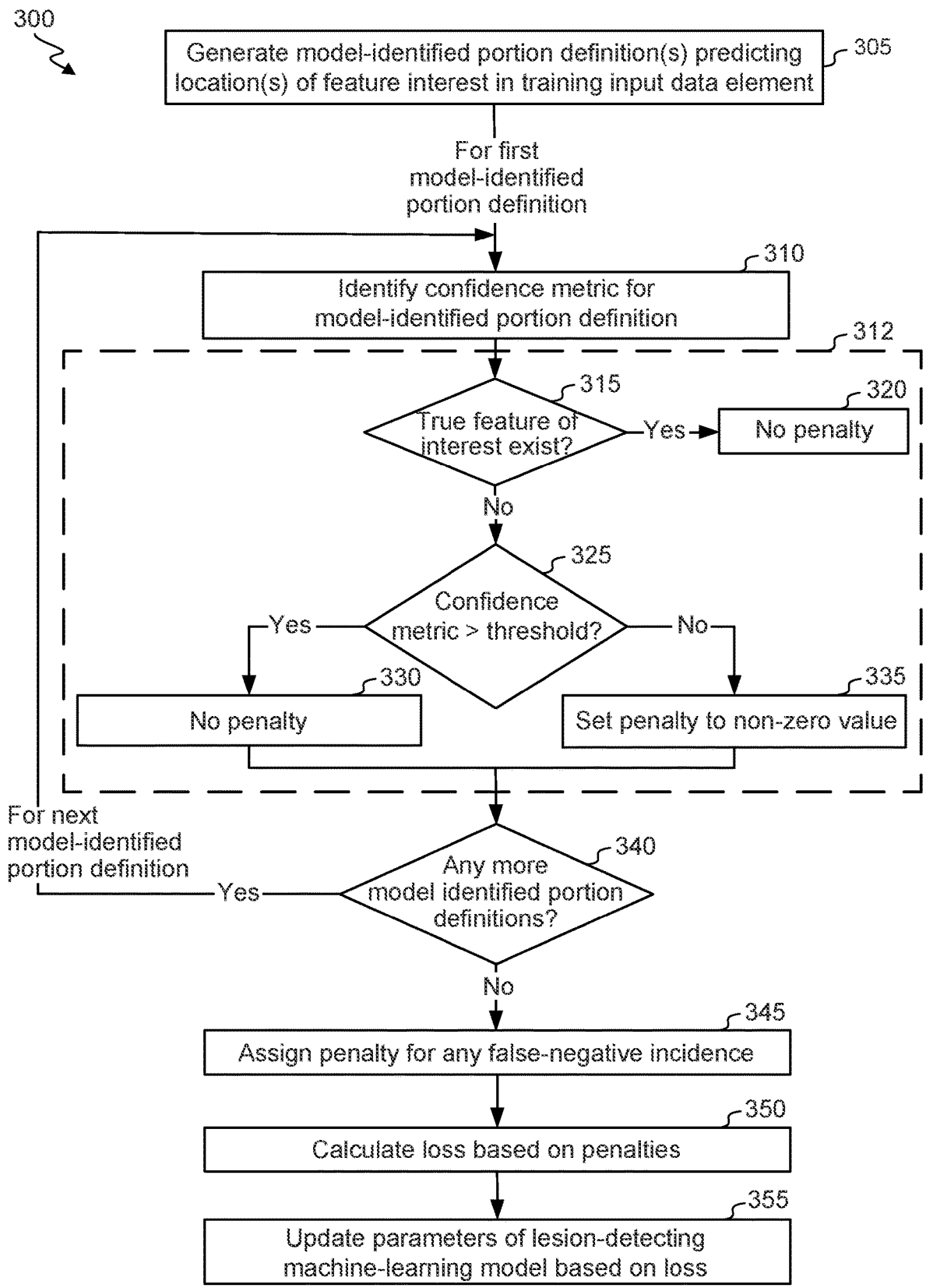
FIG. 3 illustrates a flowchart of an exemplary process for training a machine-learning model to detect lesions according to some embodiments.

FIG. 3 illustrates a flowchart of an exemplary process 300 for training machine-learning model 126 to detect features of interest. FIG. 3 may be performed in part or in its entirety by training controller 140. Process 300 begins at block 305, where training controller 140 identifies one or more model-identified portion definitions 128 for a given training input data element 108.

Training input data element 108 may have been retrieved from data store 110, along with corresponding label data 117. Training input data element 108 can include a medical image, such as a CT, x-ray, or MRI image. Each model-identified portion definition 128 generated at block 305 corresponds to a prediction that training input data element 108 includes a representation of a feature of interest and identifies a predicted location (e.g., a predicted point location, a predicted 1-dimensional span, a predicted 2-dimensional area, or a predicted 3-dimensional volume) of a given predicted feature of interest. Each model-identified portion definition 128 may have been generated by or based on an output generated by machine-learning model 126.

Machine-learning model 126 that is used to identify model-identified portion definitions 128 can include one or more convolutional neural networks (e.g., that includes one or more convolutional layers, one or more pooling layers, one or more ResNets, one or more RetinaNets, one or more feature pyramid networks, and/or one or more AlexNets). For example, machine-learning model 126 may have a RetinaNet architecture. Machine-learning model 126 can be configured to identify each representation (e.g., depiction) of at least part of a predicted feature of interest within an input data element 108 and to identify (for example) a boundary, bounding box (e.g., a 2-dimensional or 3-dimensional bounding box), perimeter (e.g., a 2-dimensional or 3-dimensional perimeter), two-dimensional area, or three-dimensional volume that defines a model-identified portion definition 128 for each predicted feature of interest. Alternatively or additionally, machine-learning model 126 can be configured to include a classifier and/or bounding-box regressor. For example, for a neural network with ResNet and feature-pyramid-network architectures can be fed to a classifier configured to predict whether a given input data element that includes an image (or portion thereof) depicts a lesion, and—if it is predicted that the image depicts at least a portion of a lesion—the bounding box regressor can predict a bounding box area or volume within the image the contains the depiction of the lesion.

Blocks 310-340 are performed for each model-identified portion definition 128. At block 310, training controller 140 identifies (e.g., accesses) confidence metric 129 for the model-identified portion definition 128. Confidence metric 129 may have been initially generated (by feature-of-interest detector 145 and/or using machine-learning model 126) when the model-identified portion definition 128 was generated. Confidence metric 129 may include a number along a scale (e.g., a 0-1 or 0-100 scale), where higher numbers represent higher confidence.

Block 312 (encompassing blocks 315-335) corresponds to actions performed by utilizing an exemplary class-disparate loss function.

At block 315, training controller 140 uses label data 117 to determine whether the model-identified portion definition 128 corresponds to a label-data portion definition 118 (so as to predict that it corresponds to an actual feature of interest). For example, training controller 140 may determine that the model-identified portion definition 128 corresponds to a label-data portion definition 118 when areas or volumes corresponding to the label-data portion definition 118 and model-identified portion definition 128 sufficiently overlap or when positions of the portion definitions are sufficiently close. If it is determined a label-data portion definition 118 corresponds to a model-identified portion definition 128, training controller 140 identifies the model-identified portion definition 128 as a true positive, and at block 320, no penalty is assigned.

If it is determined that the model-identified portion definition 128 does not correspond to any label-data portion definition 118, training controller 140 identifies the model-predicted portion definition 128 as a false positive and proceeds to block 325, where training controller 140 determines whether confidence metric 129 associated with the predicted feature of interest is greater than a predefined threshold (e.g., 10%, 20%, 30%, 40%, 50%, 60%, 70%, 80%, or 90%). If so, process 300 continues to block 330, where no penalty is assigned. Otherwise, if confidence metric 129 is below the threshold, process 300 continues to block 335, where a non-zero penalty is assigned to the model-identified portion definition 128. The non-zero penalty may (for example) be 0.5 or 1 or may scale inversely with confidence metric 129. Thus, blocks 325-335 exemplify a particular approach where a penalty for a model-identified portion definition can be based on the confidence metric associated with the model-identified portion definition.

At block 340, training controller 140 determines whether there are any additional model-identified portion definitions 128 to assess for a given loss calculation. If so, process 300 returns to block 310 to assess a next model-identified portion definition 128.

Otherwise, process 300 continues to block 345 where a penalty is assigned for each false-negative instance, where there was insufficient overlap of a portion corresponding to label-data portion definition 118 relative to each model-identified portion 128. The penalty may (for example) be 1. The penalty assigned to each false negative can thus be larger than the zero penalty assigned to each false positive associated with confidence metric 129 above the threshold (at block 330). Potentially, the penalty assigned to each false negative is also larger than the penalty assigned to each false positive associated with confidence metric 129 below the threshold (as block 335).

At block 350, training controller 140 calculates a loss for training input data element 108 based on the penalties. For example, the penalties may be summed and potentially normalized. For example, a sum of the penalties may be divided by a quantity of label-data lesions. At block 355, training controller 140 updates a set of parameters of machine-learning model 126 used by feature-of-interest detector 145 based on the loss.

Once machine-learning model 126 is trained, feature-of-interest detector 145 uses the trained machine-learning model 126 to process a non-training input data element (e.g., a raw input data element or a pre-processed version thereof) and generate an output that predicts a quantity of features of interest represented in the input data element and/or a location (e.g., by identifying a time period, time duration, boundary, bounding box, pixels or voxel corresponding to a bounding box, time period, perimeter, area, or volume) of each predicted feature of interest. The output is transmitted to a user device 150. User device 150 can include a device authorized to receive results of the image processing and lesion protection. User device 150 may be associated with a medical professional and/or care provider that is treating and/or evaluating a subject who is imaged.

Training machine-learning model 126 using class-disparate loss function 138 can result in machine-learning model 126 being able to more reliably and more accurately detect features of interest—even if a training set includes incomplete labels or incomplete annotations, such as one or more unlabeled features of interest represented in input data elements are not labeled. Further, training machine-learning model 126 using class-disparate focal loss function 138 can result in higher accuracy of machine-learning model 126 when a training data set includes a class imbalance (e.g., more depictions of non-lesion areas or volumes relative to depictions of lesions).

User device 150 can include a device that requested that the non-training input data element be processed to detect each predicted feature of interest that is represented and/or a device that availed the non-training image to input-data processing system 125. User device 150 can include a device authorized to receive results of the processing of input data elements and/or prediction of feature-of-interest incidence and/or location. User device 150 may be associated with a medical professional and/or care provider that is treating and/or evaluating a subject who is imaged. In some instances, input-data processing system 125 may return the output (that indicates whether and/or how many features of interest were detected and/or a predicted location of each predicted feature of interest) to data-collection system 105 (e.g., which may subsequently transmit the output or a processed version thereof a user device).

In some instances, feature-of-interest detector 145 uses output from machine-learning model 126 to generate an annotated version of a non-training input data element 108. For example, a perimeter of a model-identified portion (predicted by machine-learning model 126 as including a depiction of at least part of a predicted feature of interest) may be overlaid (e.g., in a particular color and/or line thickness) on the non-training image. The annotated version of the non-training image may be availed to user device 150 and/or data-collection system 105.

In some instances, feature-of-interest detector 145 compares a model-identified portion definition 128 (e.g., as identified in predicted label data 127) associated with one time point with a corresponding model-identified portion definition 128 associated with a previous time point. For example, for each predicted feature of interest that featureof-interest detector 145 detects, feature-of-interest detector 145 may assign an identifier to the predicted feature of interest. If a subsequent image is collected at a later time point for a same subject, feature-of-interest detector 145 may predict whether any predicted feature of interest detected within the subsequent image corresponds to a label-data feature of interest. This analysis may include comparing one or more pixels or voxels corresponding to a position (e.g., center or centroid), area, or volume of the predicted feature of interest detected in the subsequent image to one or more pixels or voxels corresponding to each position, area, or volume of a lesion in the previous predicted feature of interest prediction (e.g., as described above). If it is determined that the predicted feature of interest depicted (at least partly) in the subsequent image corresponds to a same predicted feature of interest depicted (at least partly) in the previous image, the predicted feature of interest in the subsequent image may be assigned a same identifier; used to estimate a change in size of the predicted feature of interest (e.g., a scalar area or volume); or used to estimate a change in location of the predicted feature of interest. If it predicted that the predicted feature of interest at least partly depicted in the subsequent image does not correspond to any predicted feature of interest at least partly depicted in the previous image, the predicted feature of interest in the subsequent image may be flagged as new and/or assigned a new identifier. Similarly, if it is determined that a given predicted feature of interest at least partly depicted in the previous image does not correspond to any predicted feature of interest at least partly depicted in the subsequent image (or multiple subsequent images), it may be inferred that the given predicted feature of interest no longer exists.

Feature-of-interest detector 145 can use this assessment to predict whether a quantity of features of interest has changed and/or whether a metric characterizing a size of a feature of interest has changed (e.g., whether an average, median, or total size of the lesions(s) have changed). This change assessment can be useful in predicting whether the subject's disease is progressing, whether the subject's disease is remitting, and/or whether a current or past treatment was effectively treating the subject's disease. In some instances, feature-of-interest detector 145 itself outputs predictions of one or more such assessments. In some instances, data corresponding to the change assessment is transmitted to a user device 150, and a user can then assess a disease progression or treatment efficacy based on the data.

It will also be appreciated that techniques described herein may be used to process an image to detect and/or locate each depiction of another type of biological object (that is not a lesion). For example, techniques may be used to detect and/or locate a depiction of damaged organ tissue, a mole, or a hemorrhage.

Figure 4:
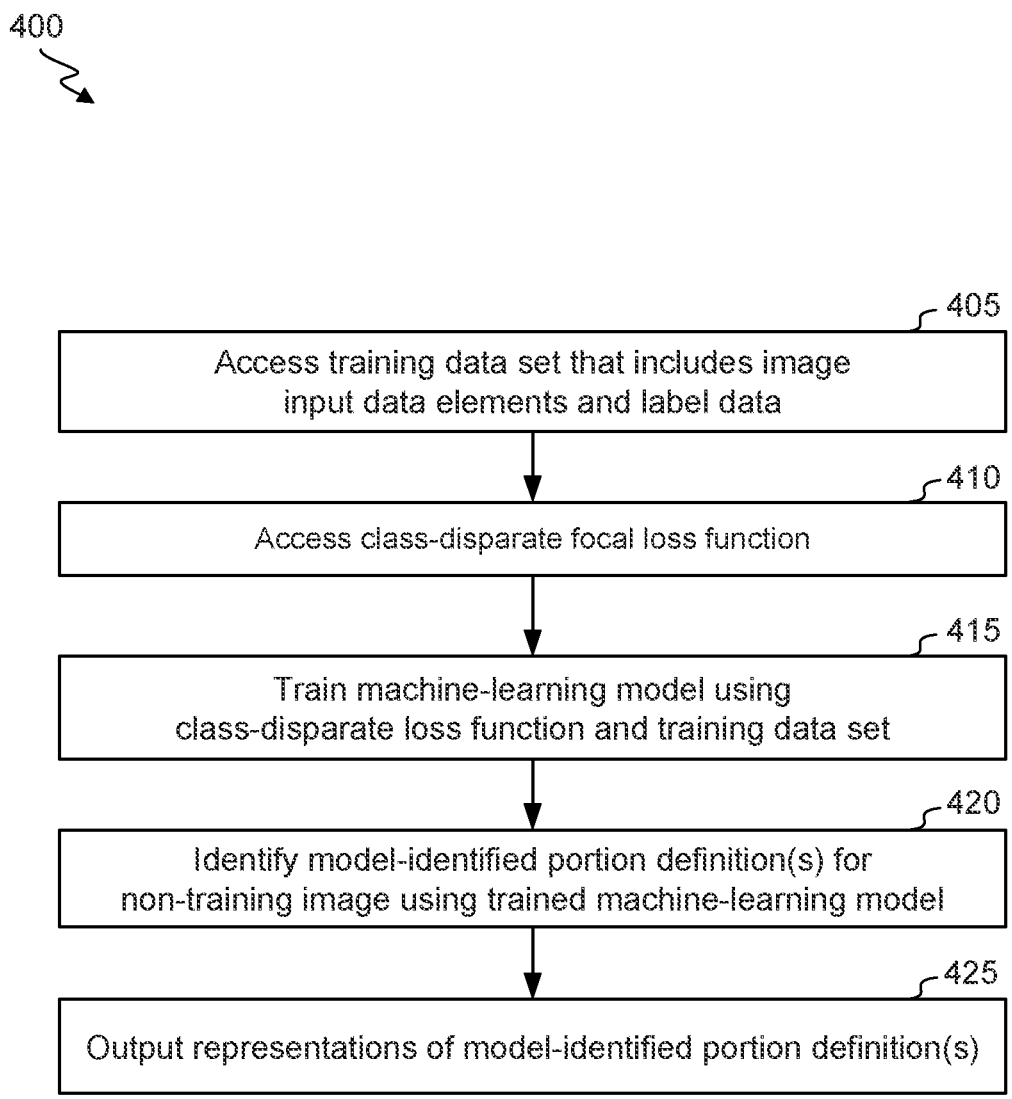
FIG. 4 shows a flowchart of an exemplary process for using a class-disparate loss function to train a machine-learning model to process medical images according to some embodiments.

III. Exemplary Processes of Using a Class-Disparate Loss Function to Train a Machine-Learning Model to Detect Depictions of Lesions FIG. 4 shows a flowchart of an exemplary process 400 for using class-disparate loss function 138 to train a machine-learning model 126 to process input data elements according to some embodiments. In particular, process 400 can train machine-learning model 126 to detect representations of a predicted feature of interest (e.g., an lesion) within an input data element (e.g., medical images). Process 400 can be performed by input-data processing system 125.

Process 400 begins at block 405, where training controller 140 (of input-data processing system 125) accesses a training data set (e.g., from data store 110, data-collection system 105 and/or annotation system 115). The training data set includes a set of data elements—each of which includes an input data element 108 and label data 117. Label data 117 includes a set of label-data portion definitions 118, each identifying a particular portion of a particular input data element 108 that represents (e.g., depicts) at least a portion of a feature of interest. A label-data portion definition 118 can identify a range (e.g., of time stamps), boundary bounding box, perimeter, area, or volume. Label data 117 may further or alternatively identify a number of features of interest that are at least partly represented in input data element 108. Label data 117 may be incomplete, in that it may include a label-data portion definition 118 for each of only an incomplete subset of features of interest at least partly represented in in the input data element 108.

At block 410, training controller 140 accesses class-disparate loss function 138. Class-disparate loss function 138 can include a dropmax focal loss function, such as the function shown in Eqn. 3 above. Class-disparate loss function 138 may be configured to penalize at least some false positives (e.g., all false positives or false positives associated with confidence metric 129 above a threshold) less drastically than false negatives.

At block 415, training controller 140 trains machine-learning model 126 using at least part of the training data set. The training can include generating one or more model-identified portion definitions (using feature-of-interest detector 145) by processing input data element 108 using machine-learning model 126.

The training may include calculating losses using class-disparate loss function 138 and updating parameters of machine-learning model 126 based on the losses. The losses may be calculated based on comparing locations of label-data portions (as identified by label-data portion definitions 118) to locations model-identified portions (as identified by model-identified portion definitions 128). The comparison may include determining which pairs of label-data portions and model-identified portions overlap by at least a threshold degree (true-positive instances), which label-data portions do not overlap by at least a threshold degree with any model-identified portion (false-negative instances), and/or which model-identified portions do not overlap by at least a threshold degree with any label-data portion (false-positive instances).

The training performed at block 415 can include calculating a loss using class-disparate loss function 138 and/or based on true-positive instances, false-negative instances, and false-positive instances. The training performed at block 415 can include updating one or more parameters of machine-learning model 126 based on the calculated loss. The training performed at block 415 may include some or all of the actions identified in association with process 300 depicted in FIG. 3.

At block 420, feature-of-interest detector 145 identifies one or more model-identified portion definitions 128 using trained machine-learning model 126 for a non-training image. More specifically, trained machine-learning model 126 receives and processes the non-training image and generates an output that predicts which portion(s) of the non-training image depict at least part of predicted a feature of interest. For each portion predicted to depict at least part of a predicted feature of interest, a model-identified portion definition 128 is generated that defines the portion. For example, model-identified portion definition 128 may identify a boundary, bounding box, area, or volume of the portion. As another example, model-identified portion definition 128 may identify one or more pixels or voxels that correspond to a center position, perimeter, boundary, area, or volume of the model-identified portion. Feature-of-interest detector 145 may further output confidence metric 129 (by using machine-learning model 126) that represents a confidence of the model-identified portion.

At block 425, feature-of-interest detector 145 outputs a representation of model-identified portion definition(s) 128 to user device 150. The representations may include or represent (for example) a boundary, bounding box, area, or volume. The representation(s) may identify one or more portions of an image predicted to represent a feature of interest. The representation(s) may be concurrently output with the corresponding input data element. For example, block 425 may include outputting a medical image that includes one or more overlays, with each overlay corresponding to a predicted feature of interest. The output may be presented locally or transmitted to another device (e.g., associated with a care provider).

IV. Example

IV.A. Example Dataset

A dataset consisting of 2568 CT-scan images from 1000 studies of 100 unique subjects was collected to train a machine-learning model to identify quantity of lesions depicted within each image and to identify a location of each depicted image. This dataset was split into a ratio of 1500 images for training, 300 for validation, and 700 for holdout for testing, respectively. The validation data was used to assess whether and/or when to terminate training. All performance metrics were calculated using the test data. The remaining 68 images were left unused. Each image included annotations identified by an annotator user using the RECIST criteria, where annotated "target" lesions were to include up to 5 lesions having a diameter of at least 10 mm per organ and up to 10 lesions having a diameter of at least 10 mm per organ per imaging session.

IV.B. Methods

IV.B.1. Example Model Structure

The automated image-annotation system for this case of lesion detection utilized a machine-learning model having a retina-net (retinanet) architecture. The retinanet architecture was composed of a resnet architecture along with a feature pyramid network. The layers in the feature pyramid network were fed into a classifier and a bounding box regressor. The salient characteristic of the architecture was the use of a focal loss function instead of a cross-entropy loss function.

A cross-entropy loss function is defined below in Eqn. 4:

$CE(p,y) = -\log(p)$ if $y=1$ $CE(p,y) = -\log(1-p)$ if $y \neq 1$    Eqn. 4 where $y \in \{\pm 1\}$ specifies a ground-truth class and $p \in [0, 1]$ is a confidence metric for the ground-truth class with a label $y=1$. The ground-truth class correlated to the label data for the dataset of images. In this instance, a label of $y=1$ was used to refer to any target lesion(s) annotated within an image. A label for any other value of y (e.g., that is not 1) refers to a part of the image that was not considered to be a lesion.

For notational convenience, the confidence metric p for the model can also be referred to in terms of pt, which is defined by Eqn. 2 (shown above, where pt is defined to be p when y=1 and to be 1–p when y≠1). Using this notation, CE(p,y) equals CE(pt), which equals –log(pt). The focal loss FL can be defined as set forth in Eqn. 1, shown above.

As explained above, training a machine-learning model with a training data set with incomplete labeling of ground-truth lesions may result in a machine-learning model biased towards predicting non-lesion labels.

Thus, results obtained the focal loss as calculated in accordance with Eqn. 1 were compared to results obtained using the dropmax focal loss as defined in Eqn. 3 (shown above, where the loss equals FL(pt) from Eqn. 1 when $pt > p_{threshold}$ and 0 otherwise), where p threshold is the kth largest element in the array of all $p_{foreground}$ in anchor boxes where ground truth=background.

In this particular example, the hyperparameter k (number of background misclassifications to ignore) for the dropmax$_{FL}$ function was selected by identifying paired values of k and recall and selecting the value of k associated with a highest recall. An upper limit for lesion detections per image was set to 4. Lesion detections with a confidence metric less than 0.05 were suppressed. Efficacy of the dropmax focal loss was evaluated as a function of the dataset size. As a byproduct of this analysis, improvement was quantified in recall that can be expected as the dataset size increases for problems involving lesion detection.

The dropmax focal loss function was implemented on [keras-retinanet], and an Nvidia Pascal GPU was used for training.

Because training data was incompletely labeled, some of the labeled lesions were dropped during training.

IV.C. Results

Figure 5:
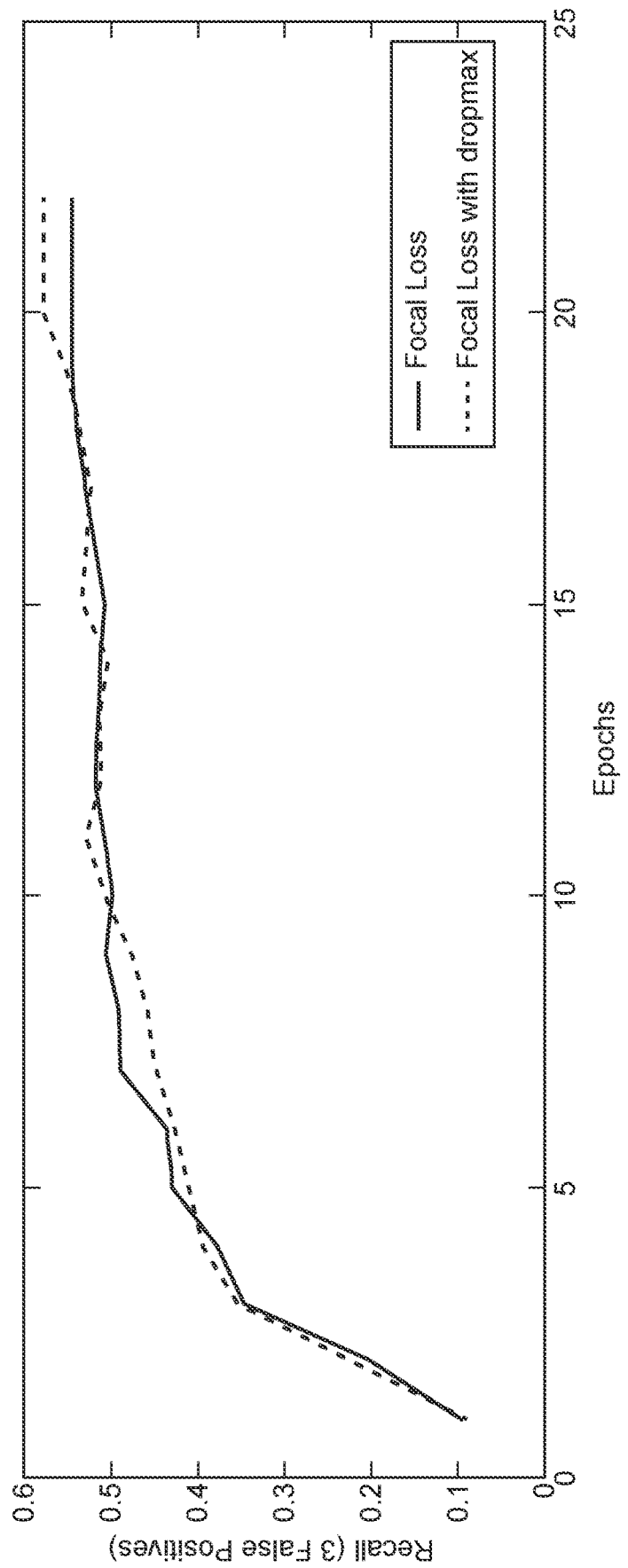
FIG. 5 shows the performance of an exemplary neural network trained using a class-disparate loss function and of an exemplary neural network trained without using a class-disparate loss function across training epochs.

FIG. 5 shows the performance of the networks on the test dataset after each epoch. Results generated using the focal loss function shown in Eqn. 4 are labeled as "Focal Loss", and results generated using the dropmax focal loss function shown in Eqn. 3 are labeled as "Focal Loss with dropmax".

In order to determine true-positive, false-positive, true-negative, and false-negative metrics, an Intersection over Union (IoU) of the ground truth and predicted bounding box was calculated. If the IoU was above 0.75, the predicted bounding box was considered to be a true positive. If a given predicted bounding box did not sufficiently overlap (based on the IoU threshold) with any ground truth bounding box, it was characterized as a false positive. If a given true positive bounding box did not sufficiently overlap (based on the IoU threshold) with any predicted bounding box, it was characterized as a false negative.

Results generated using the focal loss function shown in Eqn. 4 achieved a recall of 54.5% (at maximum detections per image of 4) and a precision of 16.46%. Meanwhile, results generated using the dropmax focal loss function shown in Eqn. 3 achieved a recall of 57.8% and a precision of 18.06%. However, the dropmax network was a slow learner, with the performance trailing that of a pure focal loss network when compared on an epoch-by-epoch basis. For this particular exemplary analysis, the dropmax network reached peak performance three epochs later. This slower learning rate may have been due to the dropped background sample from the dropmax focal loss function, since it contributed significantly to the gradient. However, dropping the example from the loss function did not impede the overall training, since background samples were abundant in the dataset.

FIGS. 6A-6F show line drawings of images from the training set for which the network trained with the dropmax focal loss function outperformed the human annotator user (as determined based on subsequent human review). Each dashed box identifies an area that the machine-learning model trained with the dropmax focal loss function predicted as corresponding to a tumor. Each solid box identifies an area that a human annotator user indicated as corresponding to a tumor. The boxes in FIGS. 6A-6C exemplify that the network was able to detect non-annotated lesions (as determined based on subsequent human review). A conventional focal loss function would result in a penalty for these detections. The dropmax focal loss function did not introduce a penalty for these detections. The dropmax focal loss function can be well-aligned with a primary objective of high recall while allowing for some false positives. After bounding boxes were identified by both a human and model, the bounding boxes identified by the model were presented to a human annotator to assess model performance, and the human annotator indicated that the model bounding boxes were more accurate than those identified by the human.

Figure 6B:
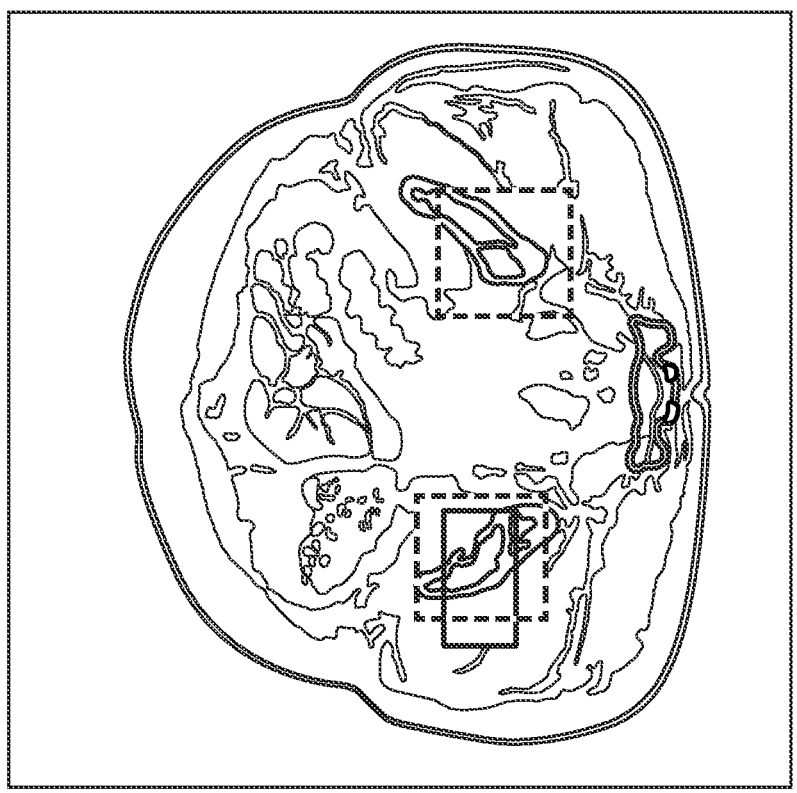
FIGS. 6A, 6B, 6C, 6D, 6E and 6F show line drawings of exemplary images from a training set used to train an exemplary neural network using a class-disparate loss system, where the neural network then outperformed a human annotator user.
Figure 6A:
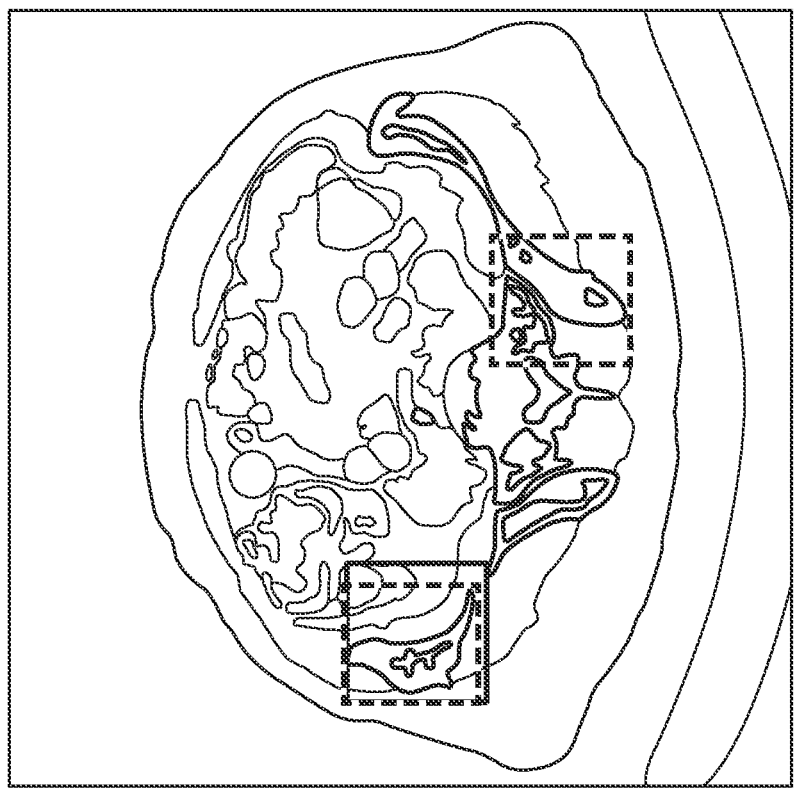
Figure 6D:
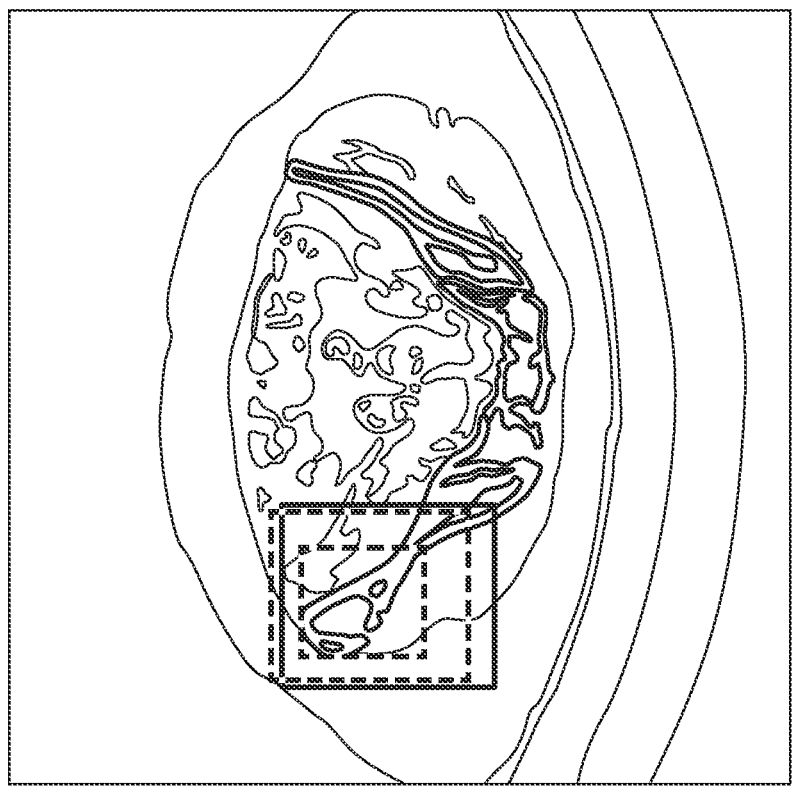
Figure 6C:
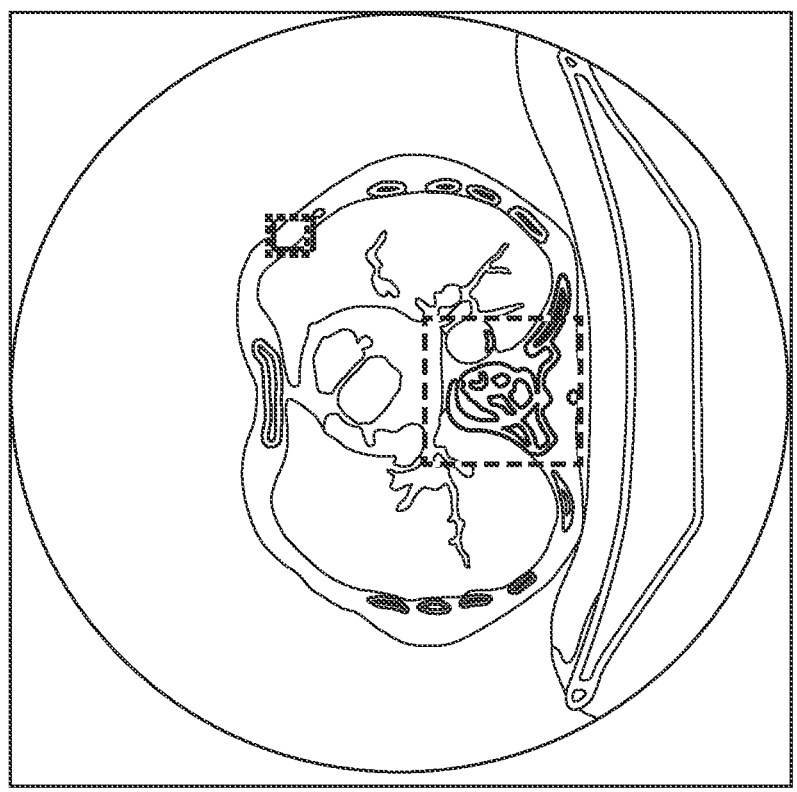
Figure 6F:
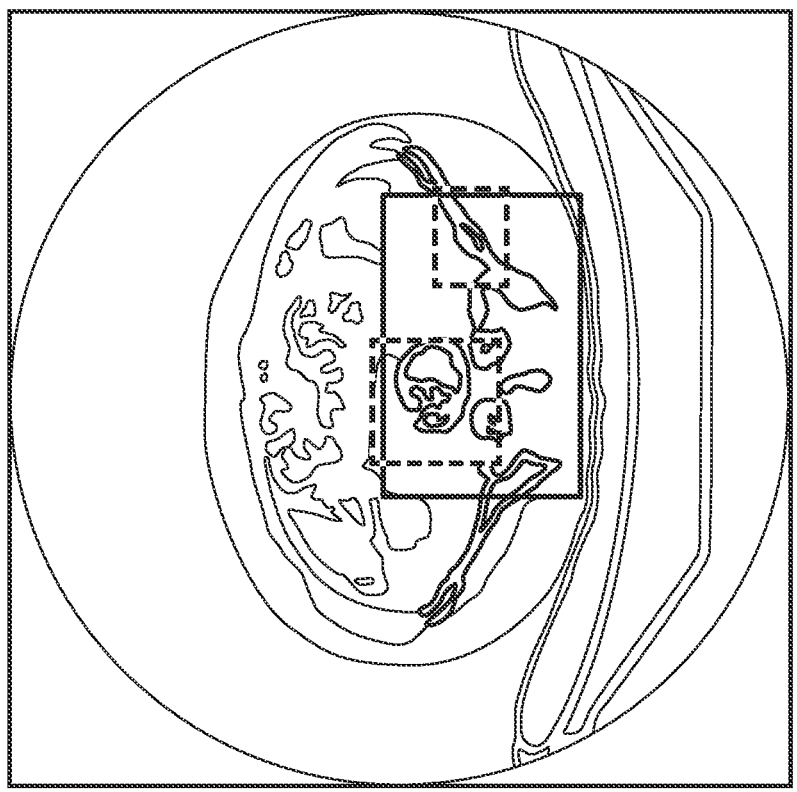
Figure 6E:
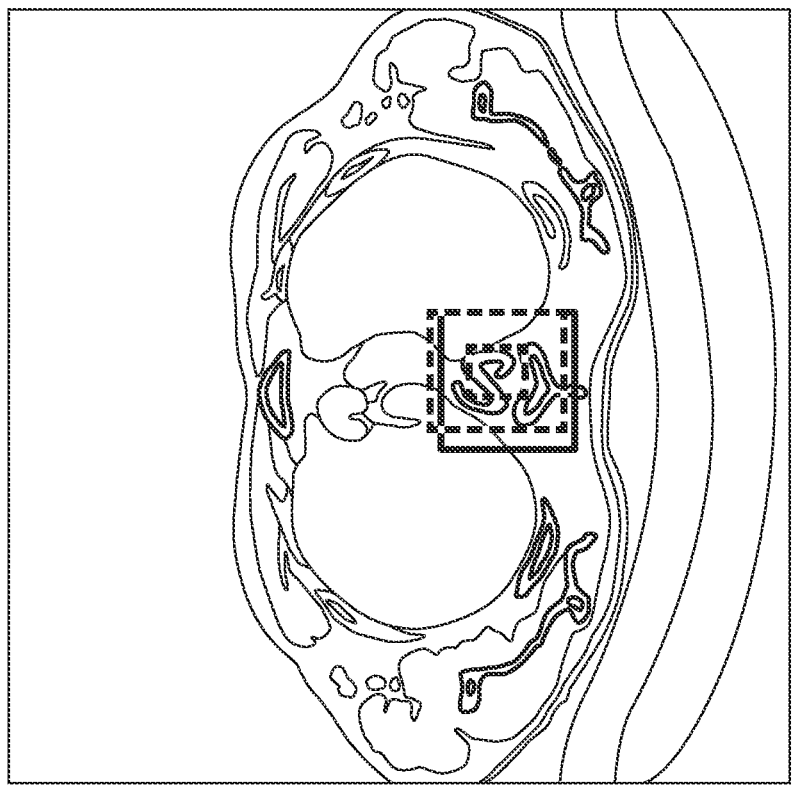

Bounding boxes shown in the FIGS. 6D-6F exemplify that the network trained with the dropmax focal loss function was able to produce a more concise bounding box than the human annotator (as determined based on subsequent human review). In some instances, an outline of a given feature may be differently defined depending on the annotator. One human annotator may choose to mark out each lesion precisely, whereas another may choose to create a larger bounding box if multiple lesions are present in close vicinity. In the depicted instance, the model trained with the dropmax focal loss function predicted that there were multiple tumors within an area that a human annotator identified as corresponding to a single tumor. The dropmax focal loss function can result in not penalizing for the additional tumor prediction, thereby indicating the dropmax focal loss function may be less sensitive to subjectivity in annotations.

Figure 7:
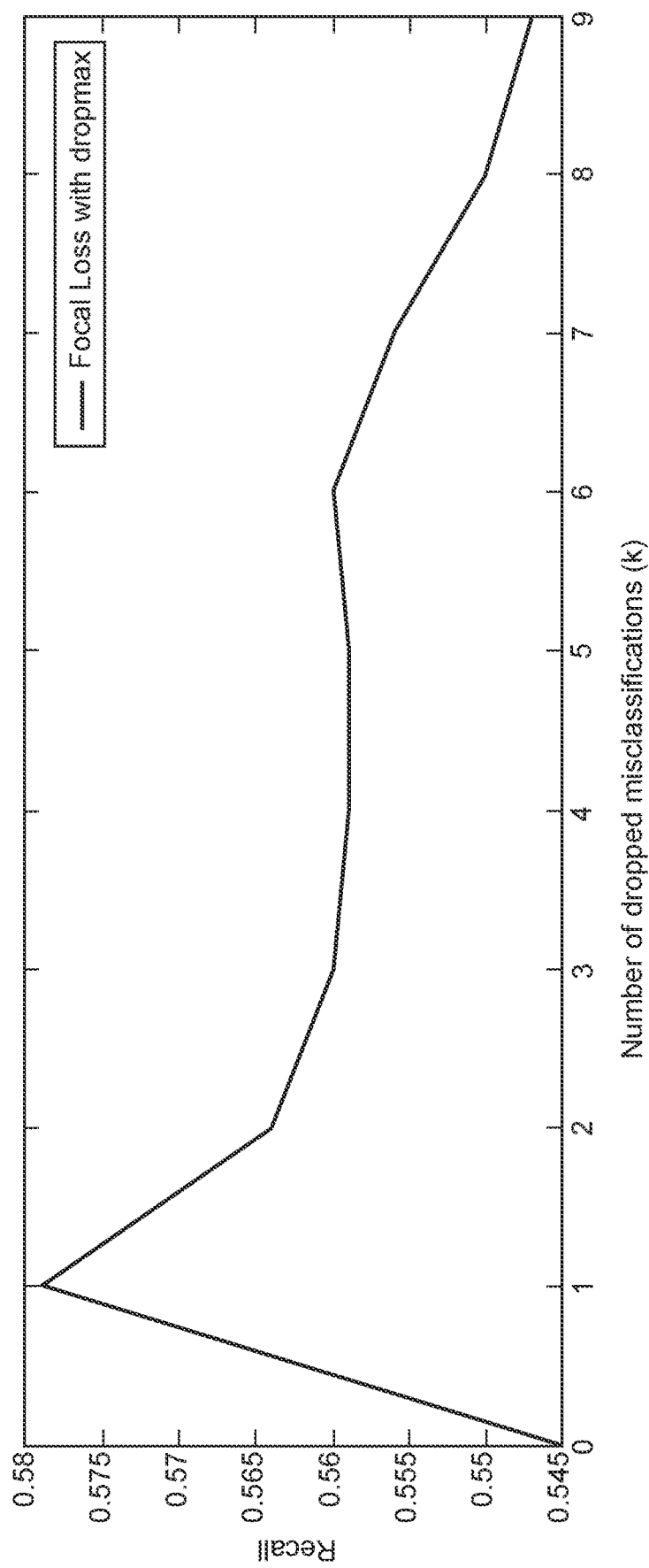
FIG. 7 shows recall performance of an exemplary neural network as a function of a number of dropped misclassifications (k) (for which no penalty was introduced).

FIG. 7 shows exemplary performance data for a machine-learning model trained with the dropmax focal loss function. The figure relates recall values to a number of dropped misclassifications (k) (for which no penalty was introduced). At k=0, focal loss with dropmax (i.e., the loss calculated using the dropmax focal loss function) was identical to focal loss. The increase in recall achieved by the dropmax focal loss function was sharpest for k=1 i.e. when one anchor box with groundtruth=background is dropped. The increase in recall was also robust fork between 1 and 6. This may have been a result of having plentiful background anchor boxes that contribute to the gradient, such that dropping a few may not have affected the learning adversely. However, as k increases, a gradual decline in performance was observed. (At approximately k=8, the benefits of dropping loss from true positives outweighs the benefits of dropping loss from false positives.) Thus, k may be selected based on the estimated number of missing annotations per image.

Figure 8:
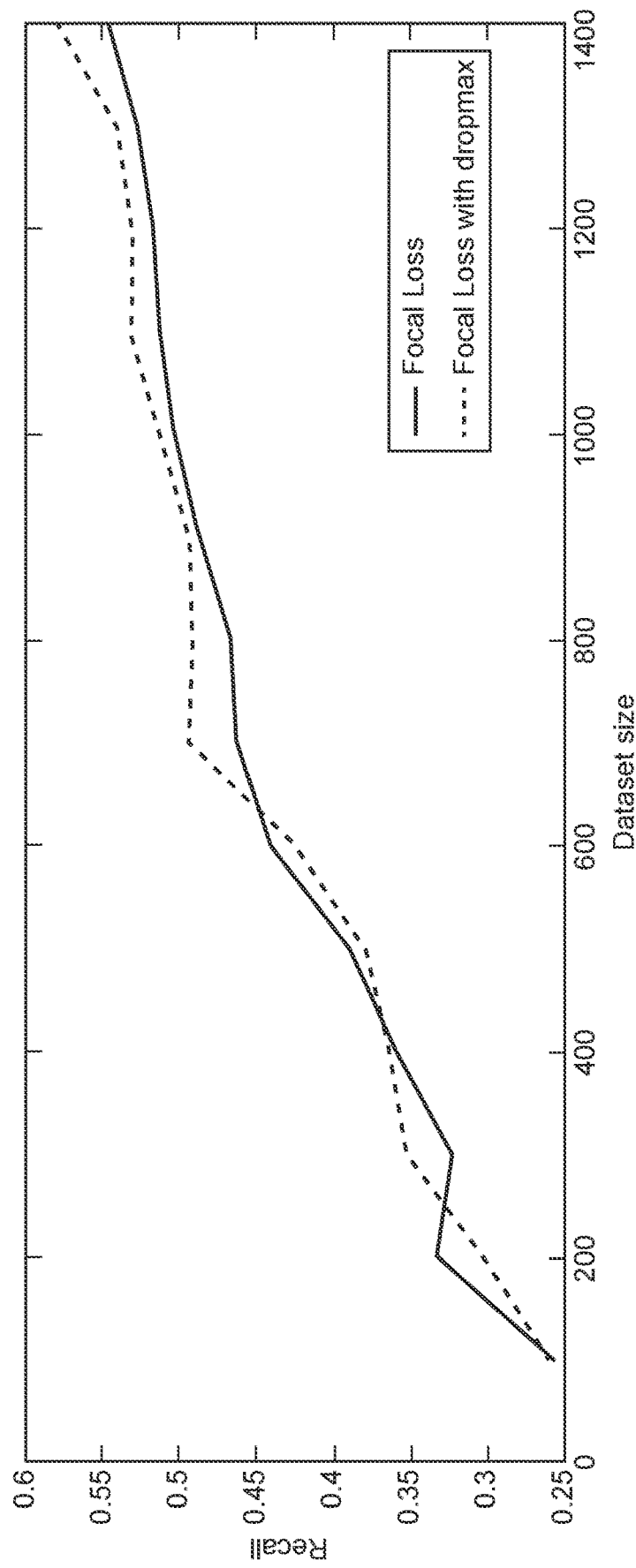
FIG. 8 shows a comparison of recall performance as a function of a number of dropped misclassifications for each of an exemplary neural network trained using a class-disparate loss function and another exemplary neural network trained using a class-disparate loss function with dropped misclassifications.

FIG. 8 shows performance data for a machine-learning model trained with the dropmax focal loss function that relates recall values relative to various dataset sizes. Performance improvement achieved by using the dropmax focal loss function was not significant for smaller data sizes. As the dataset size increased, the machine-learning model trained with the dropmax focal loss function showed increasing performance gains. The dropmax focal loss function relied on detection of missing annotations for the performance gain. Thus, the recall data may be due to the machine-learning model learning from a correctly labeled image as the dataset size increased and then detecting a feature having a similar appearance in another image. Meanwhile, smaller dataset sizes would seemingly provide fewer opportunities where learning from one training image could be applied to another image.

IV.D. Interpretation

Detection and localization efforts in deep learning can typically be divided into two categories: one stage detectors vs multi stage detectors. Multi stage detectors can first identify regions of interest and then classify each region as lesion or background. One-stage detectors use a single network to both image region and to classify the region as corresponding to a lesion or background. This example assessed the performance of a one-stage detector that used a neural network to identify regions and a class-disparate loss function to predict whether each region corresponds to a lesion.

The class-disparate loss function can hasten processing time and reduce the penalty on easily classified classes and increase the loss for frequently misclassified classes. This reduced the class imbalance between background objects and lesions seen in one stage detectors.

The dropmax focal loss function was shown to facilitate accurate training of a machine-learning model despite missing annotations in a training data set. The dropmax focal loss function was further useful to prioritize recall performance metrics and to tolerate some false positives. The dropmax focal loss function was used to train a machine-learning model using a dataset of 2500 images, and use of the dropmax focal loss function increased the recall by 3% and precision by 1.6% when up to four detections were allowed per image. The dropmax focal loss function was stable for a large range of hyperparameters, and that the performance gain from the dropmax focal loss function increased as the dataset size increases.

V. Exemplary Embodiments

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

A1. A computer-implemented method comprising:
   providing a data set including:
      an input data element, and
      one or more label data portion definitions that each identify a feature of interest within the input data element;
   training a machine-learning model using the data set by performing a set of operations including:
      generating one or more model-identified portion definitions that each identify a predicted feature of interest within the input data element, the one or more model-identified portion definitions being generated based on the machine-learning model;
classifying the feature of interest identified by a particular label data portion definition of the one or more label data portion definitions as a false negative by determining a mismatch between the particular label data portion definition and each of the one or more model-identified portion definitions;
classifying the predicted feature of interest identified by a particular model-identified portion definition of the one or more model-identified portion definitions as a false positive by determining a mismatch between the particular model-identified portion definition and each of the one or more label data portion definitions;
providing a class-disparate loss function configured to penalize false negatives more than at least some false positives;
calculating a loss using the class-disparate loss function, wherein the calculation includes assigning a penalty for the classification of the feature of interest as a false negative that is larger than any penalty assigned for the classification of the predicted feature of interest as a false positive; and
determining a set of parameter values of the machine-learning model based on the loss.

A2. The computer-implemented method of exemplary embodiment A1, wherein:
the set of operations further includes updating the machine-learning model to be configured with the set of parameter values; and
training the machine-learning model includes iteratively performing the set of operations multiple times.

A3. The computer-implemented method of exemplary embodiments A1 or A2, further comprising:
generating, for the particular model-identified portion definition, a confidence metric representing a confidence of the predicted feature of interest existing;
wherein calculating the loss includes calculating a penalty assigned for the classification of the predicted feature of interest as a false positive based on the confidence metric.

A4. The computer-implemented method of exemplary embodiment A3, wherein calculating the loss includes:
determining that the confidence metric exceeds a predetermined threshold; and
setting the penalty assigned for the classification of the predicted feature as a false positive to zero.

A5. The computer-implemented method of any of exemplary embodiments A1-A4, wherein the input data element includes an image, and wherein each of the one or more model-identified portion definitions identifies a set of pixels.

A6. The computer-implemented method of any of exemplary embodiments A1-A5, wherein the machine-learning model includes a convolutional neural network and/or a deep neural network.

A7. The computer-implemented method of any of exemplary embodiments A1-A6, wherein the set of parameter values includes values for a set of weights.

A8. The computer-implemented method of any of exemplary embodiments A1-A7, wherein the input data element includes an image, and wherein, for each label-data portion definition of the one or more label-data portion definitions, the feature of interest identified in the label-data portion definition is a tumor, a lesion, a particular cell type, or vasculature.

A9. The computer-implemented method of any of exemplary embodiments A1-A8, further comprising:
determining a quantity of false-positive classifications to be dropped from penalty assignment based on an estimated number of feature of interest representations in the data set;
wherein calculating the loss includes:
identifying a set of false-positive predicted features of interest each including a predicted feature of interest classified as a false positive;
generating, for each of the set of false-positive predicted features of interest, a confidence metric representing a confidence of the predicted feature of interest existing;
defining a subset of the set of false-positive predicted features of interest based on the quantity of false-positive classifications to be dropped and the confidence metrics; and
assigning a penalty to each of false-positive predicted feature in the subset.

A10. A method comprising:
sending a request to detect any predicted feature of interest in a particular input data element using a trained machine-learning model, the trained machine-learning model having configured with a set of parameter values learned by:
providing a data set including:
an input data element, and
one or more label data portion definitions that each identify a feature of interest within the input data element;
training a machine-learning model using the data set by:
generating one or more model-identified portion definitions that each identify a predicted feature of interest within the input data element, the one or more model-identified portion definitions being generated based on the machine-learning model;
classifying the feature of interest identified by a particular label data portion definition of the one or more label data portion definitions as a false negative by determining a mismatch between the particular label data portion definition and each of the one or more model-identified portion definitions;
classifying the predicted feature of interest identified by a particular model-identified portion definition of the one or more model-identified portion definitions as a false positive by determining a mismatch between the particular model-identified portion definition and each of the one or more label data portion definitions;
providing a class-disparate loss function configured to penalize false negatives more than at least some false positives;
calculating a loss using the class-disparate loss function, wherein the calculation includes assigning a penalty for the classification of the feature of interest as a false negative that is larger than any penalty assigned for the classification of the predicted feature of interest as a false positive; and
determining the set of parameter values of the machine-learning model based on the loss; and
receiving, in response to the sending of the request, a result that identifies one or more particular model-identified portion definitions, each of the one or more particular model-identified portion definitions identifying a portion of the particular input data element corresponding to a predicted feature of interest.

A11. The method of exemplary embodiment A10, further comprising:
   determining a diagnosis or treatment for a subject corresponding to the particular input data element based on the one or more particular model-identified portion definitions; and
   outputting an identification of the diagnosis or treatment.

A12. The method of exemplary embodiment A10 or A11, further comprising:
   collecting the particular input data element using a computed tomography (CT) scanner, magnetic resonance imaging (MM) machine, or microscope.

A13. A system comprising:
   one or more data processors; and
   a non-transitory computer readable storage medium containing instructions which, when executed on the one or more data processors, cause the one or more data processors to perform a set of actions including:
      providing a data set including:
         an input data element, and
         one or more label data portion definitions that each identify a feature of interest within the input data element;
      training the machine-learning model using the data set by:
         generating one or more model-identified portion definitions that each identify a predicted feature of interest within the input data element, the one or more model-identified portion definitions being generated based on the machine-learning model;
         classifying the feature of interest identified by a particular label data portion definition of the one or more label data portion definitions as a false negative by determining a mismatch between the particular label data portion definition and each of the one or more model-identified portion definitions;
         classifying the predicted feature of interest identified by a particular model-identified portion definition of the one or more model-identified portion definitions as a false positive by determining a mismatch between the particular model-identified portion definition and each of the one or more label data portion definitions;
         providing a class-disparate loss function configured to penalize false negatives more than at least some false positives;
         calculating a loss using the class-disparate loss function, wherein the calculation includes assigning a penalty for the classification of the feature of interest as a false negative that is larger than any penalty assigned for the classification of the predicted feature of interest as a false positive; and
         determining the set of parameter values of the machine-learning model based on the loss.

A14. A computer-program product tangibly embodied in a non-transitory machine-readable storage medium, including instructions configured to cause one or more data processors to perform part or all of one or more methods of exemplary embodiments A1-10.

VI. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The description provides preferred exemplary embodiments only, and is not intended to limit the scope, applicability or configuration of the disclosure. Rather, the description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The invention claimed is:
1. A computer-implemented method comprising:
   providing a data set including:
      an input data element, and
      one or more label data portion definitions that each identify a feature of interest within the input data element; and
   training a machine-learning model using the data set by performing a set of operations including:
      generating one or more model-identified portion definitions that each identify a predicted feature of interest within the input data element, the one or more model-identified portion definitions being generated based on the machine-learning model;
      classifying the feature of interest identified by a particular label data portion definition of the one or more label data portion definitions as a false negative by determining a mismatch between the particular label data portion definition and each of the one or more model-identified portion definitions;
      classifying the predicted feature of interest identified by a particular model-identified portion definition of the one or more model-identified portion definitions as a false positive by determining a mismatch between the particular model-identified portion definition and each of the one or more label data portion definitions;

calculating a loss using a class-disparate loss function configured to penalize false negatives more than at least some false positives, wherein the calculation includes:

identifying a set of false-positive predicted features of interest each including a predicted feature of interest classified as a false positive;

generating, for each of the set of false-positive predicted features of interest, a confidence metric representing a confidence of the predicted feature of interest existing;

defining a subset of the set of false-positive predicted features of interest based on a quantity of false-positive classifications to be dropped and the confidence metrics; and assigning a penalty to each of false-positive predicted feature in the subset, wherein the loss is calculated based on the penalties; and determining a set of parameter values of the machine-learning model based on the loss.

2. The computer-implemented method of claim 1, wherein:

the set of operations further includes updating the machine-learning model to be configured with the set of parameter values; and training the machine-learning model includes iteratively performing the set of operations multiple times, wherein a next performance of the set of operations includes training the machine-learning model using at least one other input data element included in the data set.

3. The computer-implemented method of claim 1, wherein the input data element includes a radiological image.

4. The computer-implemented method of claim 1, wherein calculating the loss further includes:

determining if each of the confidence metrics exceeds a predetermined threshold; and setting a penalty assigned for a classification of a predicted feature of interest as a false positive to zero when the confidence metric exceeds the predetermined threshold.

5. The computer-implemented method of claim 1, wherein the input data element includes an image, and wherein each of the one or more model-identified portion definitions identifies a set of pixels.

6. The computer-implemented method of claim 1, wherein the machine-learning model includes a convolutional neural network and/or a deep neural network.

7. The computer-implemented method of claim 1, wherein the set of parameter values includes values for a set of weights.

8. The computer-implemented method of claim 1, wherein the input data element includes an image, and wherein, for each label-data portion definition of the one or more label-data portion definitions, the feature of interest identified in the label-data portion definition is a tumor, a lesion, a particular cell type, or vasculature.

9. The computer-implemented method of claim 1, further comprising:

determining the quantity of false-positive classifications to be dropped from penalty assignment based on an estimated number of features of interest representations in the data set.

10. A method comprising:

sending a request to detect any predicted feature of interest in a particular input data element using a trained machine-learning model, the trained machine-learning model having been configured with a set of parameter values learned by:

providing a data set including:

an input data element, and one or more label data portion definitions that each identify a feature of interest within the input data element; and training a machine-learning model using the data set by:

generating one or more model-identified portion definitions that each identify a predicted feature of interest within the input data element, the one or more model-identified portion definitions being generated based on the machine-learning model;

classifying the feature of interest identified by a particular label data portion definition of the one or more label data portion definitions as a false negative by determining a mismatch between the particular label data portion definition and each of the one or more model-identified portion definitions;

classifying the predicted feature of interest identified by a particular model-identified portion definition of the one or more model-identified portion definitions as a false positive by determining a mismatch between the particular model-identified portion definition and each of the one or more label data portion definitions;

calculating a loss using a class-disparate loss function configured to penalize false negatives more than at least some false positives, wherein the calculation includes:

identifying a set of false-positive predicted features of interest each including a predicted feature of interest classified as a false positive;

generating, for each of the set of false-positive predicted features of interest, a confidence metric representing a confidence of the predicted feature of interest existing;

defining a subset of the set of false-positive predicted features of interest based on a quantity of false-positive classifications to be dropped and the confidence metrics; and assigning a penalty to each of false-positive predicted feature in the subset, wherein the loss is calculated based on the penalties; and determining a set of parameter values of the machine-learning model based on the loss; and receiving, in response to the sending of the request, a result that identifies one or more particular model-identified portion definitions, each of the one or more particular model-identified portion definitions identifying a portion of the particular input data element corresponding to a predicted feature of interest.

11. The method of claim 10, further comprising:

determining a diagnosis or treatment for a subject corresponding to the particular input data element based on the one or more particular model-identified portion definitions; and outputting an identification of the diagnosis or treatment.

12. The method of claim 10, further comprising:
collecting the particular input data element using a computed tomography (CT) scanner, magnetic resonance imaging (MRI) machine, or microscope.

13. A system comprising:
one or more data processors; and
a non-transitory computer readable storage medium containing instructions which, when executed on the one or more data processors, cause the one or more data processors to perform a set of actions including:
   providing a data set including:
      an input data element, and
      one or more label data portion definitions that each identify a feature of interest within the input data element; and
   training a machine-learning model using the data set by performing a set of operations including:
      generating one or more model-identified portion definitions that each identify a predicted feature of interest within the input data element, the one or more model-identified portion definitions being generated based on the machine-learning model;
      classifying the feature of interest identified by a particular label data portion definition of the one or more label data portion definitions as a false negative by determining a mismatch between the particular label data portion definition and each of the one or more model-identified portion definitions;
      classifying the predicted feature of interest identified by a particular model-identified portion definition of the one or more model-identified portion definitions as a false positive by determining a mismatch between the particular model-identified portion definition and each of the one or more label data portion definitions;
      calculating a loss using a class-disparate loss function configured to penalize false negatives more than at least some false positives, wherein the calculation includes:
         identifying a set of false-positive predicted features of interest each including a predicted feature of interest classified as a false positive;
         generating, for each of the set of false-positive predicted features of interest, a confidence metric representing a confidence of the predicted feature of interest existing;
         defining a subset of the set of false-positive predicted features of interest based on a quantity of false-positive classifications to be dropped and the confidence metrics; and
         assigning a penalty to each of false-positive predicted feature in the subset, wherein the loss is calculated based on the penalties; and
      determining a set of parameter values of the machine-learning model based on the loss.

14. The system of claim 13, wherein:
the set of operations further includes updating the machine-learning model to be configured with the set of parameter values; and
training the machine-learning model includes iteratively performing the set of operations multiple times, wherein a next performance of the set of operations includes training the machine-learning model using at least one other input data element included in the data set.

15. The system of claim 13, wherein the input data element includes a radiological image.

16. The system of claim 13, wherein calculating the loss further includes:
determining if each of the confidence metric exceeds a predetermined threshold; and
setting a penalty assigned for a classification of a predicted feature of interest as a false positive to zero when the confidence metric exceeds the predetermined threshold.

17. The system of claim 13, wherein the input data element includes an image, and wherein each of the one or more model-identified portion definitions identifies a set of pixels.

18. The system of claim 13, wherein the machine-learning model includes a convolutional neural network and/or a deep neural network.

19. The system of claim 13, wherein the set of parameter values includes values for a set of weights.

20. A non-transitory machine-readable storage medium storing instructions which, when executed by one or more data processors, cause the one or more data processors to perform a set of actions including:
providing a data set including:
   an input data element, and
   one or more label data portion definitions that each identify a feature of interest within the input data element; and
training a machine-learning model using the data set by performing a set of operations including:
   generating one or more model-identified portion definitions that each identify a predicted feature of interest within the input data element, the one or more model-identified portion definitions being generated based on the machine-learning model;
   classifying the feature of interest identified by a particular label data portion definition of the one or more label data portion definitions as a false negative by determining a mismatch between the particular label data portion definition and each of the one or more model-identified portion definitions;
   classifying the predicted feature of interest identified by a particular model-identified portion definition of the one or more model-identified portion definitions as a false positive by determining a mismatch between the particular model-identified portion definition and each of the one or more label data portion definitions;
   calculating a loss using a class-disparate loss function configured to penalize false negatives more than at least some false positives, wherein the calculation includes:
      identifying a set of false-positive predicted features of interest each including a predicted feature of interest classified as a false positive;
      generating, for each of the set of false-positive predicted features of interest, a confidence metric representing a confidence of the predicted feature of interest existing;
      defining a subset of the set of false-positive predicted features of interest based on a quantity of false-positive classifications to be dropped and the confidence metrics; and
      assigning a penalty to each of false-positive predicted feature in the subset, wherein the loss is calculated based on the penalties; and determining a set of parameter values of the machine-
learning model based on the loss.

\* \* \* \* \*